(12) United States Patent
Kodama et al.

(10) Patent No.: US 11,030,558 B2
(45) Date of Patent: Jun. 8, 2021

(54) SYSTEM AND DEVICE FOR EVALUATING OPERATION RESULT OF CORRUGATED PAPERBOARD BOX MAKING MACHINE

(71) Applicant: KABUSHIKI KAISHA ISOWA, Nagoya (JP)

(72) Inventors: Junichi Kodama, Kasugai (JP); Yoshimichi Takahashi, Kitanagoya (JP); Hikaru Isowa, Nagoya (JP); Junya Yasuda, Nagoya (JP); Masataka Kitagawa, Komaki (JP)

(73) Assignee: KABUSHIKI KAISHA ISOWA, Aichi (JP)

( * ) Notice: Subject to any disclaimer, the term of this patent is extended or adjusted under 35 U.S.C. 154(b) by 0 days.

(21) Appl. No.: 16/783,658

(22) Filed: Feb. 6, 2020

(65) Prior Publication Data
US 2020/0265360 A1  Aug. 20, 2020

(30) Foreign Application Priority Data
Feb. 19, 2019  (JP) .............................. JP2019-027507

(51) Int. Cl.
| | |
|---|---|
| *G06Q 10/06* | (2012.01) |
| *G06Q 50/04* | (2012.01) |
| *B31B 50/00* | (2017.01) |

(52) U.S. Cl.
CPC ..... *G06Q 10/06313* (2013.01); *B31B 50/006* (2017.08); *G06Q 50/04* (2013.01)

(58) Field of Classification Search
CPC .......................................... G06Q 10/00–50/00
(Continued)

(56) References Cited

U.S. PATENT DOCUMENTS

| 7,379,782 B1 * | 5/2008 | Cocco | ................... G06Q 10/06 |
| | | | 700/103 |
| 7,380,213 B2 * | 5/2008 | Pokorny | ............... B23Q 35/12 |
| | | | 715/764 |

(Continued)

FOREIGN PATENT DOCUMENTS

| JP | 2812694 | 8/1998 |
| JP | 3583121 | 8/2004 |

(Continued)

OTHER PUBLICATIONS

Chang, Qing, et al. "Supervisory factory control based on real-time production feedback." (2007): 653-660. (Year: 2007).*

(Continued)

*Primary Examiner* — Alan S Miller
(74) *Attorney, Agent, or Firm* — Brinks Gilson & Lione

(57) ABSTRACT

The operation result evaluation system comprises: an operation result information generation part to generate operation result information including a production count and an achieved operating time period; and an operation result evaluation device for, after completion of production of corrugated paperboard boxes for a given order, evaluating an operation result of the box making machine. The operation result evaluation device is operable to: with respect to each order, calculate an additional operating time period which is a difference between a target operating time period and the achieved operating time period; generate analytical information regarding an operating time period (FIG. 8) in each order; with respect to each of the entirety or part of a given number of orders, generate comparative information (FIG. 9); and cause the generated comparative information to be transmitted to a user terminal.

17 Claims, 14 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,698,011 | B2* | 4/2010 | Tsuda | G05B 23/0283 700/108 |
| 10,136,022 | B2 | 11/2018 | Takahashi | |
| 2002/0010563 | A1* | 1/2002 | Ratteree | G06Q 10/06 703/2 |
| 2003/0036933 | A1* | 2/2003 | Shetty | G06Q 10/06312 705/7.22 |
| 2003/0154144 | A1* | 8/2003 | Pokorny | G06Q 10/10 705/28 |
| 2003/0167238 | A1* | 9/2003 | Zeif | G06Q 99/00 705/400 |
| 2003/0170357 | A1* | 9/2003 | Garwood | B65D 81/268 426/392 |
| 2004/0093114 | A1* | 5/2004 | Magario | G05B 15/02 700/197 |
| 2004/0153868 | A1 | 8/2004 | Nonaka et al. | |
| 2006/0136786 | A1 | 6/2006 | Nonaka et al. | |
| 2006/0136787 | A1 | 6/2006 | Yano et al. | |
| 2006/0191993 | A1* | 8/2006 | Markham | G06Q 10/00 235/376 |
| 2007/0043464 | A1* | 2/2007 | Zeif | G06Q 30/0283 700/108 |
| 2007/0192128 | A1* | 8/2007 | Celestini | G06Q 40/00 705/35 |
| 2009/0043413 | A1 | 2/2009 | Yano et al. | |
| 2009/0094080 | A1* | 4/2009 | Luotojarvi | G05B 19/4184 705/7.15 |
| 2009/0157569 | A1* | 6/2009 | Henby | G06Q 10/06395 705/500 |
| 2009/0234482 | A1* | 9/2009 | Ide | H01L 21/67276 700/100 |
| 2009/0259333 | A1 | 10/2009 | Yano et al. | |
| 2009/0306805 | A1* | 12/2009 | Kyoh | H01L 22/20 700/110 |
| 2018/0150066 | A1* | 5/2018 | Chen | G05B 19/41865 |

FOREIGN PATENT DOCUMENTS

| | | |
|---|---|---|
| JP | WO2009-087827 | 7/2009 |
| JP | 2010-120274 | 6/2010 |
| JP | 2012-008974 | 1/2012 |
| JP | WO2014/073088 | 5/2014 |
| JP | 5998955 | 9/2016 |
| JP | 2018-014441 | 1/2018 |

OTHER PUBLICATIONS

Jeong, Ki-Young, and Don T. Phillips. "Operational efficiency and effectiveness measurement." International Journal of Operations & Production Management (2001). (Year: 2001).*

Andersson, Carin, and Monica Bellgran. "On the complexity of using performance measures: Enhancing sustained production improvement capability by combining OEE and productivity." Journal of Manufacturing Systems 35 (2015): 144-154. (Year: 2015).*

Tsarouhas, Panagiotis. "Improving operation of the croissant production line through overall equipment effectiveness (OEE)." International journal of productivity and performance management (2019). (Year: 2019).*

* cited by examiner

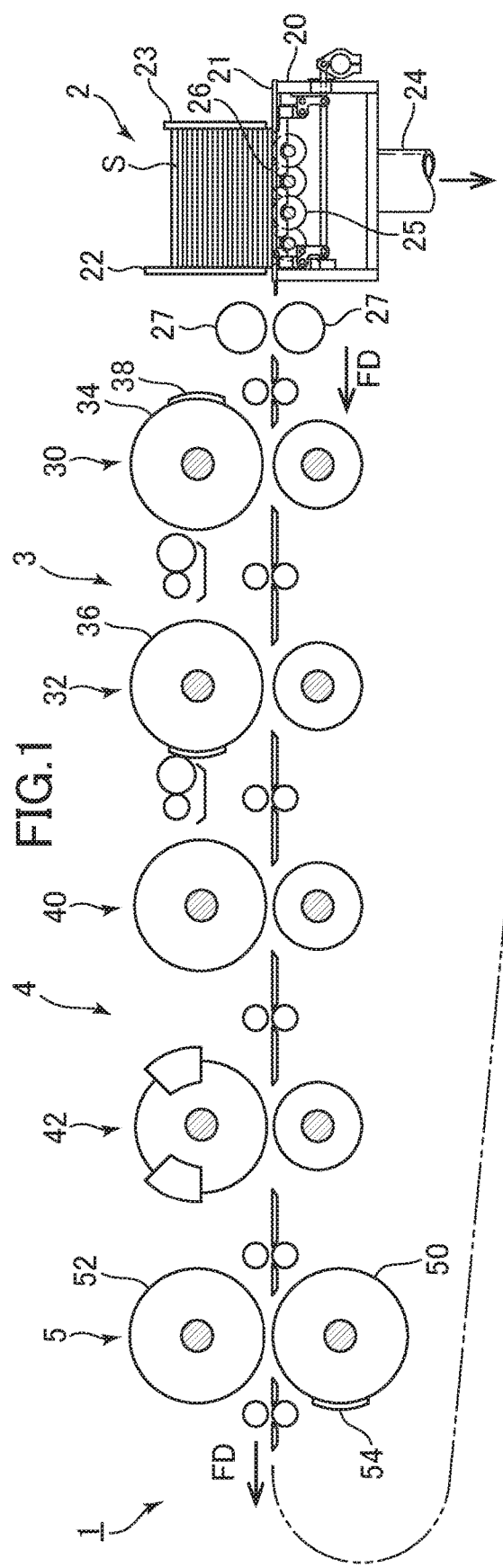
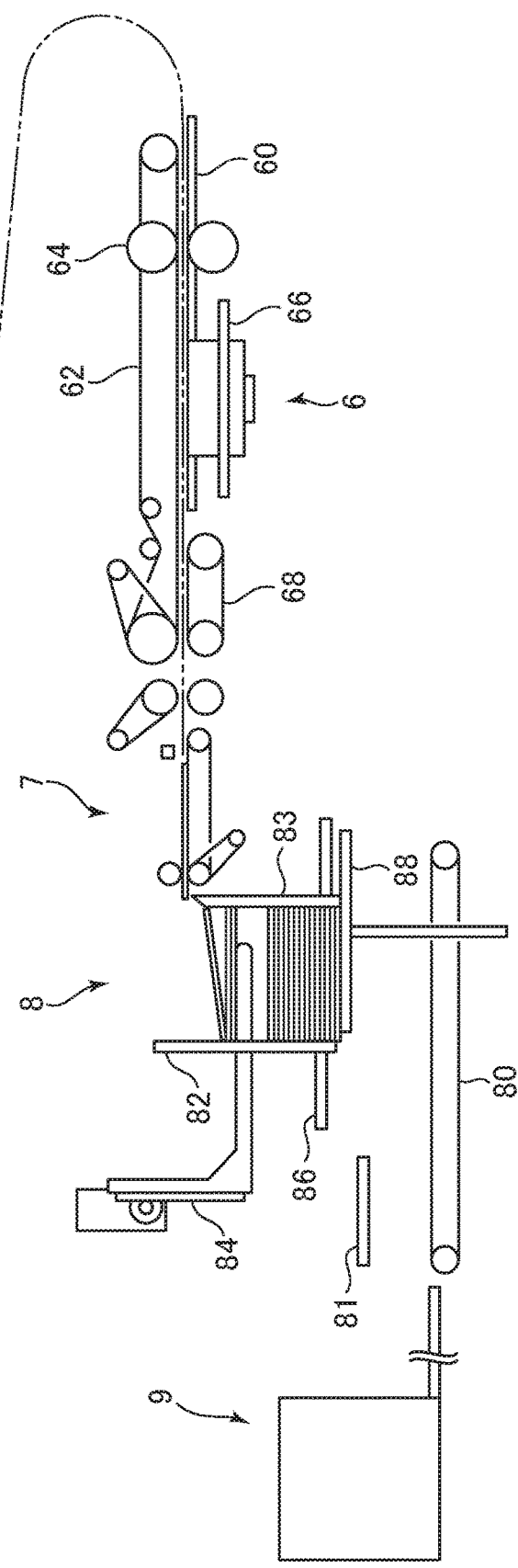
FIG.1

FIG.6

| Basic Information | |
|---|---|
| Product code | 1010000 |
| Flute | B |
| Type of box shape | A type |
| Sheet size | 320 × 1131 (conveyance direction × width direction) |
| Binding number | 20 sheets |
| Scheduled count | 980 sheets |
| Printing unit to be used | 1st color: use, 2nd color: use, 3rd color: non-use |
| Ink to be used | 1st color: 010, 2nd color: 140, 3rd color: non-use |
| Wooden form to be used | Non-use |

FIG.7

| Operation Result Information | |
|---|---|
| Production date | 2018/11/30 |
| Production count | 1000 sheets during one order cycle (including 10 sheets during preparatory time period) |
| Achieved operating time period | 260 sec |
| Achieved shutdown time period | 0 sec |
| Achieved preparatory time period | 214 sec |

FIG.8

| Analytical Information | |
|---|---|
| Limited operating speed | 250 sheets/min |
| Production count (during operating time period) | 990 sheets |
| Target operating time period | 238 sec |
| Additional operating time period | 22 sec |
| Time period achievement rate | 92% |
| Achieved operating speed | 228 sheets/min |
| Operating speed difference | 22 sec |
| Speed achievement rate | 91% |

FIG.9

| Comparative Information | |
|---|---|
| Product code | 1010000 |
| Production date | 2018/11/30 |
| Flute | B |
| Sheet size | 320 × 1131 |
| Production count (during operating time period) | 990 sheets |
| Current additional operating time period | 22 sec |
| Past production date | 2018.11.1 |
| Past additional operating time period | 6 sec |

FIG.10

| Comparative Information | |
|---|---|
| Product name | Shumai |
| Production date | 2018/11/30 |
| Flute | B |
| Sheet size | 320 × 1131 |
| Production count (during operating time period) | 990 sheets |
| Achieved operating speed | 228 sheets/min |
| Past production date | 2018.11.1 |
| Past achieved operating speed | 235 sheets/min |

FIG.11

Sheet Conveyance Directional Length (width)

| Width / Binding Number | 0 | 400 | 500 | 600 | 700 | 800 | 900 | 1000 | 1100 | 1200 | 1300 | 1400 |
|---|---|---|---|---|---|---|---|---|---|---|---|---|
| 0 | 100 | 95 | 90 | 86 | 81 | 76 | 72 | 67 | 65 | 90 | 90 | 90 |
| 6 | 250 | 250 | 250 | 230 | 215 | 195 | 175 | 160 | 150 | 150 | 150 | 150 |
| 11 | 250 | 250 | 250 | 250 | 235 | 220 | 200 | 160 | 150 | 150 | 150 | 150 |
| 16 | 250 | 250 | 250 | 250 | 235 | 220 | 200 | 170 | 150 | 150 | 150 | 150 |
| 21 | 250 | 250 | 250 | 250 | 235 | 220 | 200 | 170 | 150 | 150 | 150 | 150 |

FIG.12

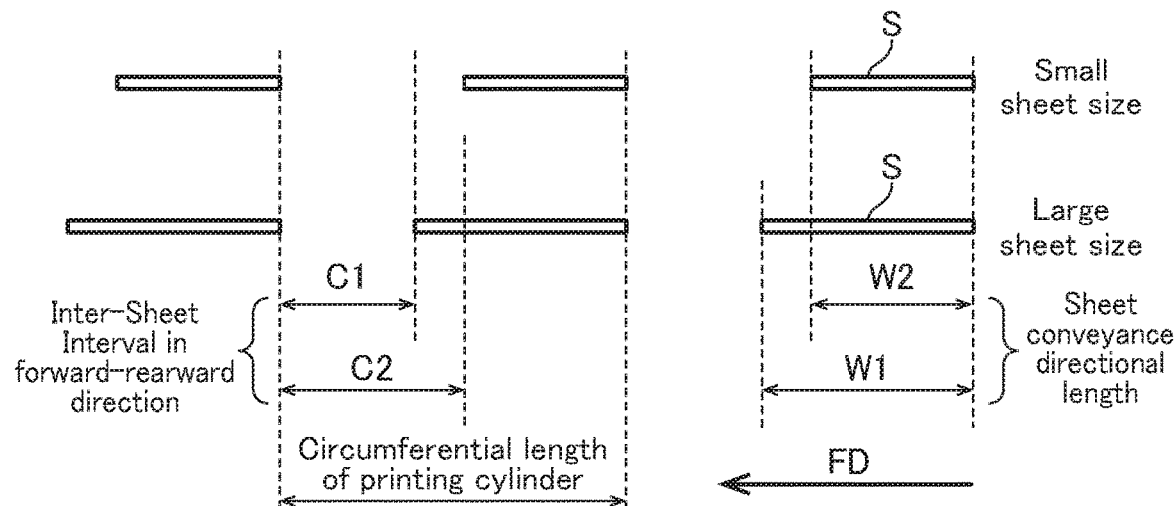

FIG.13

| Information to be stored in Server Device | |
|---|---|
| Product code | 1010000 |
| Flute | B |
| Type of box shape | A type |
| Sheet size | 320 × 1131 |
| Binding number | 20 sheets |
| Printing unit to be used | 1st color: use, 2nd color: use, 3rd color: non-use |
| Ink to be used | 1st color: 010, 2nd color: 140, 3rd color: non-use |
| Wooden form to be used | Non-use |
| Production date | 2018/11/30 |
| Production count | 1000 sheets during one order cycle (including 10 sheets during preparatory time period) |
| | 990 sheets during operating time period |
| Achieved operating time period | 260 sec |
| Achieved shutdown time period | 0 sec |
| Achieved preparatory time period | 214 sec |
| Limited operating speed | 250 sheets/min |
| Target operating time period | 238 sec |
| Additional operating time period | 22 sec |
| Time period achievement rate | 92% |
| Achieved operating speed | 228 sheets/min |
| Operating speed difference | 22 sec |
| Speed achievement rate | 91% |

FIG.14

| No. | Product code | Production date | Production count | | | Operating time period (sec) | | | | Operating speed (sec) | | | | Sheet size | | Binding Number |
|---|---|---|---|---|---|---|---|---|---|---|---|---|---|---|---|---|
| | | | Order cycle | During preparation | During operation | Result | Target | Difference | Achievement rate | Result | Target | Difference | Achievement rate | Conveyance direction | Width direction | |
| 1 | 15378623 | 20181101 | 108 | 2 | 106 | 26 | 25 | 1 | 96 | 245 | 250 | 5 | 98 | 490 | 1266 | 10 |
| 2 | 22151510 | 20181101 | 650 | 1 | 649 | 260 | 181 | 79 | 70 | 150 | 215 | 65 | 70 | 768 | 1307 | 10 |
| 3 | 28456648 | 20181101 | 154 | 1 | 153 | 44 | 37 | 7 | 84 | 209 | 250 | 41 | 84 | 468 | 1493 | 10 |
| 4 | 22568641 | 20181101 | 203 | 2 | 201 | 48 | 48 | 0 | 100 | 250 | 250 | 0 | 100 | 484 | 1297 | 10 |
| 5 | 101000 | 20181101 | 2200 | 5 | 2195 | 533 | 527 | 6 | 99 | 247 | 250 | 3 | 99 | 320 | 1131 | 20 |
| 6 | 1483326 | 20181101 | 1580 | 10 | 1570 | 377 | 377 | 0 | 100 | 250 | 250 | 0 | 100 | 436 | 1419 | 20 |

Product 1030000
Record of Additional Operating Time Period and Achieved Operating Speed Product 1010000
Inter-Roll Gap Setting Value

SYSTEM AND DEVICE FOR EVALUATING OPERATION RESULT OF CORRUGATED PAPERBOARD BOX MAKING MACHINE

RELATED APPLICATIONS

This application claims priority to Japanese Patent Application No. 2019-027507, filed on Feb. 19, 2019, the entire content of which is incorporated herein by reference.

BACKGROUND OF THE INVENTION

1. Field of the Invention

The present invention relates to an operation result evaluation system and device for use in a corrugated paperboard box making machine, and particularly to an operation result evaluation system for use in a corrugated paperboard box making machine to evaluate an operation result of the box making machine, based on information about an order for corrugated paperboard boxes and information about the operation result of the box making machine.

2. Description of the Related Art

Heretofore, there has been known a corrugated paperboard box making machine for subjecting a corrugated paperboard sheet to printing, slotting, punching, formation of a plurality of creases, folding along the creases, and joining, thereby producing a corrugated paperboard box. In response to a recent industry-wide trend toward high-mix low-volume production, the high-mix low-volume production is also needed for corrugated paperboard boxes. In such a situation, a factory for producing corrugated paperboard boxes by a corrugated paperboard box making machine is operated to produce corrugated paperboard boxes for a large number of orders received from customers, e.g., as many as 100 or more orders/day, while sequentially switching the orders. Further, there is a need for a user of a corrugated paperboard box making machine for producing corrugated paperboard boxes (a producer of corrugated paperboard boxes) for a large number of orders, to efficiently produce good-quality corrugated paperboard boxes, while shortening an operating time period for producing each corrugated paperboard box, as much as possible.

Here, for example, in JP 2812694B (Patent Document 1), there is described a technique for accurately monitoring an operation state of a machine such as a printing machine, wherein the content of production such as a production count and an operation time is displayed in the form of list in the order of date.

SUMMARY OF THE INVENTION

Technical Problem

Meanwhile, almost of a large number of orders for corrugated paperboard boxes received by a corrugated plant are repeat orders (reorders) for previously produced corrugated paperboard boxes. Here, the repeat order means an order for corrugated paperboard boxes having the same specifications as those of a previous order. However, the volume of the repeat order is different from that of a previous order, in many cases.

Because of a machine configuration and performance of machine components, the box making machine is limited in terms of an allowable operating speed (an upper limit of a speed at which a corrugated paperboard sheet can be conveyed).

However, the above limited operating speed of the box making machine is further limited by order conditions such as a sheet size. Thus, when the box making machine is actually operated at the limited operating speed of the machine itself, it is likely to fail to stably convey a corrugated paperboard sheet, so that the fed sheet can be ejected as a defective product. Actually, such a speed to be limited depending on each order becomes a substantial limited operating speed during operation of the box making machine (actual limited operating speed). Here in a repeat order, corrugated paperboard box specifications are the same as those of a previous order, so that the limited operating speed is the same as that used in production of corrugated paperboard boxes for a previous order. Therefore, if the box making machine is operated at this limited operating speed, it is possible to produce corrugated paperboard boxes for the repeat order in a state in which an operating time period-dependent cost is maximally suppressed.

However, under the condition that a machine component constituting the box making machine is worn or degraded, even if the box making machine is operated at the actual limited operating speed, a corrugated paperboard sheet is more likely to undergo a conveyance displacement, and become a detective product. Thus, generally, in a step of preliminary work prior to continuous sheet feeding, an operator conducts trial processing several times while adjusting the operating speed, to set the operating speed to a lowered value at which no defective product occurs during continuous sheet feeding.

In this situation, in a repeat order, it is considered that good corrugated paperboard boxes can be produced by operating the box making machine at an operating speed equal to that adjusted in a past-order, particularly a previous order. However, if many days have passed from the previous order, there is a possibility that the degree of wear or degradation of each machine component is increased. Thus, even in a repeat order, in a preliminary work prior to continuous sheet feeding, an operator still conducts trial processing several times while adjusting the operating speed, to set the operating speed to a lowered value at which no defective product occurs during continuous sheet feeding.

Here, it is possible to cope with wear or degradation of a machine component, by performing replacement of such a machine component, adjustment of the box making machine, etc., based on a result of inspection and maintenance of the machine, thereby returning a reduced operating speed (production speed) to an original value. However, the box making machine is structurally complicated and large in size, so that it takes a long time period for the inspection. Moreover, during the inspection, the machine has to be stopped or shut down, so that it becomes unable to produce corrugated paperboard boxes during that period. Therefore, a user who needs to produce corrugated paperboard boxes for a large number of orders per day is hard to secure the time for inspection, and is apt to limit the inspection to the minimum. In this case, there can arise a situation where, despite user's intension, the user figures out wear or the like of a machine component constituting the box making machine, only after the machine component fails to operate properly. Moreover, in a case where it takes a long time period for procurement of a replacement for the damaged component, a shutdown time period of the machine is extended, leading to a risk that good-quality products cannot be delivered in an order-designated volume before due date.

Further, the user is hard to take notice of wear or degradation of a machine component, in a state in which the machine can be normally operated. That is, even when a machine component becomes worn or degraded, such a defect cannot be evaluated from the external appearance of the machine, and the wear or degradation of machine component is less likely to appear as a visible defective state. Further, even in a state in which a machine component is worn or degraded, the machine is not immediately shut down, but can be operated to produce products for a while. For these reasons, there can also arise the situation where, despite user's intension, the user figures out wear or the like of a machine component constituting the box making machine, only after the machine component fails to operate properly.

On the other hand, when a machine component becomes worn or degraded as mentioned above and consequently a resulting corrugated paperboard box becomes defective, the user takes an action to reduce the operating speed, even in a repeat order. With a focus on such an action, the present inventors considered that, by providing, to a user, operation result information regarding a decrease in the operating speed or the like in a current repeat order with respect to a past-order, it is possible to cause the user to take notice of a sign of wear or degradation of a machine component and recognize the necessity of inspection. Here, it is difficulty for the user to memorize a past operation result of a specific order, because a repeat order is irregularly issued, and a large number of orders have to be handled in a day. In the device described in the Patent Document 1, it is necessary to search a past operation result of a specific repeat order backward in time, while looking at a list of operation records, so that a user has to take a lot of time and effort.

Based on the above, the present inventors considered that firstly, it is important for a user, even in a repeat order, to efficiently produce good-quality corrugated paperboard boxes, while shortening the operating time period for producing each corrugated paperboard box, as much as possible; and, secondly, in order to effectively achieve the first object, it is important to allow the user to recognize the necessity and timing to stop the machine so as to inspect the machine.

It is therefore an object of the present invention to provide an operation result evaluation system and device for use in a corrugated paperboard box making machine to provide, to a user, information indicative of a relationship between an operation result of a repeat order and an operation result of a past-order whose corrugated paperboard box specifications are the same as those of the repeat order.

It is another object of the present invention to provide an operation result evaluation system and device for use in a corrugated paperboard box making machine to provide, to a user, quantitative information regarding a loss dependent on operating time period in each of current- and past-orders having the same corrugated paperboard box specifications, or a loss dependent on operating speed of each of the orders having the same corrugated paperboard box specifications, thereby allowing the user to take notice of a sign of degradation of a machine component and recognize the necessity of inspection.

Solution to Technical Problem

In order to achieve the above objects, according to a first aspect of the present invention, there is provided an operation result evaluation system for use in a corrugated paperboard box making machine to evaluate an operation result of the box making machine, based on order information which is information regarding an order for corrugated paperboard boxes, and operation result information which is information regarding the operation result of the box making machine. The operation result evaluation system comprises: a production management device for the box making machine, wherein the production management device comprises a production count counting part configured to count a production count which is a number of corrugated paperboard boxes produced for each order by the box making machine, an achieved operating time period calculation part configured to calculate an achieved operating time period during which corrugated paperboard boxes have been produced for each order by the box making machine, and an operation result information generation part configured to, with respect to each order, generate operation result information including a production date of corrugated paperboard boxes, the production count and the achieved operating time period; an operation result evaluation device configured to, after completion of production of corrugated paperboard boxes for a given order, evaluate the operation result of the box making machine, with regard to a given number of orders; and a storage device for storing therein a given database, wherein the operation result evaluation device comprises: an achieved production count calculation part configured to, with respect to each order, calculate, based on the generated operation result information, an achieved production count which is a number of corrugated paperboard boxes produced by the box making machine during the achieved operating time period; a limited operating speed calculation part configured to, with respect to each order, calculate, based on the order information, a limited operating speed of the box making machine to be limited depending on each order; a target operating time period calculation part configured to, with respect to each order, calculate a target operating time period, based on the calculated achieved production count and the calculated limited operating speed; a target and result comparison part configured to, with respect to each order, compare the calculated target operating time period with the achieved operating time period to calculate an additional operating time period which is a difference between the target operating time period and the achieved operating time period, and/or a time period achievement rate which is a quotient obtained by dividing the target operating time period by the achieved operating time period; and an analytical information generation part configured to generate analytical information regarding the operating time period in each order, based on the calculated additional operating time period and/or the calculated time period achievement rate, wherein the given database stored in the storage device includes the analytical information regarding the operating time period for each order, the production date in the operation result information and the order information for each order, associated with the analytical information regarding the operating time period, and wherein the operation result evaluation device further comprises: a past-order identification part configured to refer to order information of past production dates in the database stored in the storage device to, with respect to each of an entirety or part of the given number of orders, identify a past-order of a past production date having the same corrugated paperboard box specifications as those in the order information of any one of the entirety or part of the given number of orders; a past information acquisition part configured to acquire analytical information regarding a past operating time period for the identified past-order, in the database stored in the storage device, and a production date in the operation result information associated with the acquired analytical information; a comparative information generation part configured to, with respect to each of the entirety or part of the given number of orders, associate the generated analytical information regarding the operating time period and the production date thereof, the acquired analytical information regarding the past operating time period and the past production date thereof, and the order information common in them, thereby generating comparative information; and an information transmission control part configured to cause the generated comparative information to be transmitted to a user terminal.

In the first aspect of the present invention having the above feature, the operation result evaluation system comprises the production management device, the operation result evaluation device configured to, after completion of production of corrugated paperboard boxes for a given order, evaluate the operation result of the box making machine, with regard to a given number of orders (e.g., orders of the same production date), and the storage device for storing therein a given database. The production management device is configured to, with respect to each order, generate the operation result information including the production date, the production count and the achieved operating time period in regard to production of corrugated paperboard boxes, and the operation result evaluation device is configured to: with respect to each order, calculate the achieved production count which is the number of corrugated paperboard boxes produced by the box making machine during the achieved operating time period; with respect to each order, calculate the limited operating speed of the box making machine; with respect to each order, calculate the target operating time period; with respect to each order, calculate the additional operating time period which is a difference between the target operating time period and the achieved operating time period, and/or the time period achievement rate obtained by dividing the target operating time period by the achieved operating time period; and generate the analytical information regarding the operating time period in each order, based on the calculated additional operating time period and/or the calculated time period achievement rate, wherein the given database stored in the storage device includes the analytical information regarding the operating time period for each order, the production date in the operation result information and the order information for each order, and wherein the operation result evaluation device further is further configured to refer to order information of past production dates in the database to, with respect to each of an entirety or part of the given number of orders (e.g., an order selected based on the magnitude of the additional operating time period), identify a past-order of a past production date having the same corrugated paperboard box specifications as those in the order information of any one of the entirety or part of the given number of orders; acquire analytical information regarding a past operating time period for the identified past-order, in the database stored in the storage device, and a production date in the operation result information associated with the acquired analytical information; with respect to each of the entirety or part of the given number of orders, associate the generated analytical information regarding the operating time period and the production date thereof, the acquired analytical information regarding the past operating time period and the past production date thereof, and the order information common in them, thereby generating comparative information; and cause the generated comparative information to be transmitted to a user terminal. Thus, it is possible to provide, to a user, information indicative of a relationship between an operation result of a repeat order which is an order having the same order information as that of a past-order, and an operating result of a past-order having the same corrugated paperboard box specifications as those of the repeat order, so as to allow the user to figure out the efficiency in production of corrugated paperboard boxes in each order after completion of production. Further, by providing, to the user, quantitative information regarding a loss dependent on the operating time period in each of current- and past-orders having the same corrugated paperboard box specifications, it is possible to allow the user to take notice of a sign of degradation of a machine component and recognize the necessity of inspection.

In order to achieve the above objects, according to a second aspect of the present invention, there is provided an operation result evaluation system for use in a corrugated paperboard box making machine to evaluate an operation result of the box making machine, based on order information which is information regarding an order for corrugated paperboard boxes, and operation result information which is information regarding the operation result of the box making machine. The operation result evaluation system comprises: a production management device for the box making machine, wherein the production management device comprises a production count counting part configured to count a production count which is a number of corrugated paperboard boxes produced for each order by the box making machine, an achieved operating time period calculation part configured to calculate an achieved operating time period during which corrugated paperboard boxes have been produced for each order by the box making machine, and an operation result information generation part configured to, with respect to each order, generate operation result information including production date of corrugated paperboard boxes, the production count and the achieved operating time period; an operation result evaluation device configured to, after completion of production of corrugated paperboard boxes for a given order, evaluate the operation result of the box making machine, with regard to a given number of orders; and a storage device for storing therein a given database, wherein the operation result evaluation device comprises: an achieved production count calculation part configured to, with respect to each order, calculate, based on the generated operation result information, an achieved production count which is a number of corrugated paperboard boxes produced by the box making machine during the achieved operating time period; a limited operating speed calculation part configured to, with respect to each order, calculate, based on the order information, a limited operating speed of the box making machine to be limited depending on each order; a target operating speed setting part configured to, with respect to each order, set the calculated limited operating speed of the box making machine, as a target operating speed; an achieved operating speed calculation part configured to, with respect to each order, calculate an achieved operating speed of box making machine, based on the calculated achieved production count and the achieved operating time period; a target and result comparison part configured to, with respect to each order, compare the set target operating speed with the calculated achieved operating speed to calculate an operating speed difference which is a difference between the target operating speed and the achieved operating speed, and/or a speed achievement rate which is a quotient obtained by dividing the achieved operating speed by the target operating speed; and an analytical information generation part configured to generate analytical information regarding the operating speed in each order, based on the achieved operating speed, the calculated operating speed difference and/or the calculated speed achievement rate, wherein the given database stored in the storage device includes the analytical information regarding the operating speed in each order, and the production date in the operation result information and the order information in each order associated with the analytical information regarding the operating speed, and wherein the operation result evaluation device further comprises: a past-order identification part configured to refer to order information of past production dates in the database stored in the storage device to, with respect to each of an entirety or part of the given number of orders, identify a past-order of a past production data having the same corrugated paperboard box specifications as those in the order information of any one of the entirety or part of the given number of orders; a past information acquisition part configured to acquire analytical information regarding a past operating speed for the identified past-order, in the database stored in the storage device, and a production date in the operation result information associated with the acquired analytical information; a comparative information generation part configured to, with respect to each of an entirety or part of the given number of orders, associate the generated analytical information regarding the operating speed and the production date thereof, the acquired analytical information regarding the past operating speed the past production date thereof, and the order information common in them, thereby generating comparative information; and an information transmission control part configured to cause the generated comparative information to be transmitted to a user terminal.

In the second aspect of the present invention having the above feature, the operation result evaluation system comprises the production management device, the operation result evaluation device configured to, after completion of production of corrugated paperboard boxes for a given order, evaluate the operation result of the box making machine, with regard to a given number of orders (e.g., orders of the same production date), and the storage device for storing therein a given database. The production management device is configured to: with respect to each order, generate the operation result information including the production date, the production count and the achieved operating time period in regard to production of corrugated paperboard boxes, and the operation result evaluation device is configured to: with respect to each order, calculate the achieved production count which is the number of corrugated paperboard boxes produced by the box making machine during the achieved operating time period; with respect to each order, calculate the limited operating speed of the box making machine; with respect to each order, set the calculated limited operating speed as a target operating speed; with respect to each order, calculate an achieved operating speed of box making machine; with respect to each order, calculate the operating speed difference which is a difference between the target operating speed and the achieved operating speed, and/or the speed achievement rate which is a quotient obtained by dividing the achieved operating speed by the target operating speed; and generate the analytical information regarding the operating speed in each order, based on the achieved operating speed, the calculated operating speed difference and/or the calculated speed achievement rate, wherein the given database stored in the storage device includes the analytical information regarding the operating speed in each order, and the production date in the operation result information and the order information in each order, and wherein the operation result evaluation device is further configured to refer to order information of past production dates in the database to, with respect to each of an entirety or part of the given number of orders (e.g., an order selected based on the magnitude of the additional operating time period), identify a past-order of a past production date having the same corrugated paperboard box specifications as those in the order information of any one of the entirety or part of the given number of orders; acquire analytical information regarding a past operating speed for the identified past-order, in the database stored in the storage device, and a production date in the operation result information associated with the acquired analytical information; with respect to each of the entirety or part of the given number of orders, associate the generated analytical information regarding the operating speed and the production date thereof, the acquired analytical information regarding the past operating speed and the past production date thereof, and the order information common in them, thereby generating comparative information; and cause the generated comparative information to be transmitted to a user terminal. Thus, it is possible to provide, to a user, information indicative of a relationship between an operation result of a repeat order which is an order having the same order information as that of a past-order, and an operating result of a past-order having the same corrugated paperboard box specifications as those of the repeat order, so as to allow the user to figure out the efficiency in production of corrugated paperboard boxes in each order after completion of production. Further, by providing, to the user, quantitative information regarding a loss dependent on the operating speed in each of current- and past-orders having the same corrugated paperboard box specifications, it is possible to allow the user to take notice of a sign of degradation of a machine component and recognize the necessity of inspection.

Preferably, in the operation result evaluation system according to the first aspect of the present invention, the analytical information generation part of the operation result evaluation device is operable to, with respect to each of the orders of the same production date, generate the analytical information regarding the operation time period; the operation result evaluation device further comprises a first order selection part configured to select an order having a largest value of the additional operating time period and/or a smallest value of the time period achievement rate, among values of the additional operating time period and/or values of the time period achievement rate each included in the generated analytical information regarding the operating time period, among the orders of the same production date; the past-order identification part of the operation result evaluation device is operable to identify a past-order of a past production date having the same corrugated paperboard box specifications as those in the order information of the order selected by the first order selection part; and the past information acquisition part of the operation result evaluation device is operable to acquire a past additional operating time period and/or a past time period achievement rate in the past-order of the past production date identified by the past order identification part, and acquire the past production date of the identified past-order, wherein the comparative information for each of the entirety or part of the given number of orders to be generated by the comparative information generation part of the operation result evaluation device is a combination of the comparative information for the order selected by the first selection part and the comparative information for the past-order identified by the past-order identification part, and wherein the comparative information generation part is operable to generate the comparative information by associating the additional operating time period and/or the time period achievement rate in the selected order; the production date of the selected order; the past additional operating time period and/or the past time period achievement rate in the identified past-order; the production date of the identified past-order; and the order information common in them, with each other; and the information transmission control part is operable to cause the generated comparative information to be transmitted to the user terminal.

According to this feature, for example, among values of the additional operating time period included in the analytical information regarding the operation result information for each of the given number of orders of the same production date, an order having the largest valve of the additional operating time period is selected. Then, the comparative information is generated by associating the additional operating time period and/or the time period achievement rate in the selected order; the production date of the selected order; the past additional operating time period and/or the past time period achievement rate in the identified past-order; the production date of the identified past-order; and the order information common in them, with each other, and transmitted to the user terminal. In this case, the amount of information to be displayed on the user terminal is relatively small, and information of only the order having the largest valve of the additional operating time period is provided to a user, so that it is possible to allow the user to easily and more accurately figure out the efficiency in production of corrugated paperboard boxes by the box making machine. Further, it is possible to more reliably cause the user to take notice of a sign of degradation of a machine component.

Preferably, in the operation result evaluation system according to the first aspect of the present invention, the analytical information generation part of the operation result evaluation device is operable to, with respect to each of the orders of the same production date, generate the analytical information regarding the operation time period; the past-order identification part is operable to, with respect to each of the orders of the same production date, identify a past-order of a past production date having the same corrugated paperboard box specifications as those in the order information of any one of the orders of the same production date; the past information acquisition part of the operation result evaluation device is operable to, with respect to the identified past-order of the past production date, acquire the analytical information regarding the past operating time period in the database stored in the storage device, and the production date in the operation result information associated with the analytical information; and the operation result evaluation device further comprises a second order selection part configured to compare each of the additional operating time period and/or the time period achievement rate included in the analytical information regarding the operating time period in each of the orders of the same production date generated by the analytical information generation part, with a corresponding one of the past additional operating time period and/or the past time period achievement rate included in the analytical information regarding the past operating time period in the past-order of the past production date acquired by the past information acquisition part configured to select an order having a largest difference in terms of the additional operating time period and/or the time period achievement rate, wherein the comparative information for the entirety or part of the given number of orders to be generated by the comparative information generation part of the operation result evaluation device is a combination of the comparative information for the order selected by the second selection part and the comparative information for the past-order having the same corrugated paperboard box specifications as those in the order information of the selected order, and wherein the comparative information generation part is operable to generate the comparative information by associating the additional operating time period and/or the time period achievement rate in the selected order; the production date of the selected order; the past additional operating time period and/or the past time period achievement rate in the past-order; the past production date of the past-order; and the order information common in them, with each other; and the information transmission control part is operable to cause the generated comparative information to be transmitted to the user terminal.

According to this feature, for example, with respect to each of the orders of the same production date, a past-order of a past production date having the same corrugated paperboard box specifications as those in the order information of any one of the orders of the same production date is identified, and each of the additional operating time period and/or the time period achievement rate in each of the orders of the same production date with a corresponding one of the past additional operating time period and/or the past time period achievement rate in the identified past-order to select an order having the largest difference in terms of the additional operating time period and/or the time period achievement rate. Then, the comparative information is generated by associating the additional operating time period, etc., in the selected order; the production date of the selected order; the past additional operating time period, etc., in the past-order; the past production date of the past-order; and the order information common in them, with each other, and transmitted to the user terminal. In this case, it is possible to allow the user to easily and more accurately figure out the efficiency in production of corrugated paperboard boxes by the box making machine. Further, it is possible to more reliably cause the user to take notice of a sign of degradation of a machine component.

Preferably, in the operation result evaluation system according to the first aspect of the present invention, the analytical information regarding the operating time period in each order which is to be generated by the analytical information generation part, include the achieved production count in each order, calculated by the achieved production count calculation part; and the comparative information to be generated by the comparative information generation part includes the achieved production count in each order, included in the analytical information.

According to this feature, the achieved production count is included in the comparative information, so that it is possible to allow the user to figure out the level of the production count when the comparative information is obtained, and thereby more accurately figure out the efficiency in production of corrugated paperboard boxes by the box making machine.

Preferably, in the operation result evaluation system according to the first aspect of the present invention, the achieved operating time period calculation part of the production management device is operable to calculate, as the achieved operating time period, an operating time period during which an operation state is detected in which two or more corrugated paperboard boxes are produced per 5 seconds by the box making machine.

According to this feature, it is possible to accurately calculate the operating time period for producing corrugated paperboard boxes, and thereby calculate a value of the additional operating time period which is a difference between the target operating time period and the achieved operating time period, or the like, as a value more accurately reflecting wear or the like of a machine component of the box making machine. Thus, it is possible to provide the comparative information as information conforming to the state of the box making machine, and thereby allow a user of the box making machine to more accurately figure out degradation or the like of a machine component of the box making machine.

Preferably, in the operation result evaluation system according to the first aspect of the present invention, the order information includes a sheet conveyance directional sheet length, and a binding number of box-structured corrugated paperboard sheets, each of which is to be set with respect to each order, and wherein the limited operating speed calculation part of the operation result evaluation device is operable to, with respect to each order, calculate the limited operating speed of the box making machine to be limited depending on each order, based on the sheet conveyance directional sheet length and the binding number, each included in the order information; and values of the limited operating speed of the box making machine each predetermined with respect to a respective one of various combinations of values of the sheet conveyance directional sheet length and values of the binding number.

According to this feature, the limited operating speed of the box making machine to be limited depending on each order is calculated based on values of the limited operating speed of the box making machine each predetermined with respect to a respective one of various combinations of values of the sheet length in the sheet conveyance direction and values of the binding number of box-structured corrugated paperboard sheets, so that it is possible to more accurately calculate the limited operating speed of the box making machine in each order, based on the specifications of a counter-ejector of the box making machine and the binding number in the order information. Thus, the target operating time period to be calculated based on the limited operating speed can be calculated as a more accurate target value.

Preferably, in the operation result evaluation system according to the first aspect of the present invention, the given database stored in the storage device further comprises a database for storing the operation result information in each order generated by the operation result information generation part of the production management device, in association with the order information of the order, and wherein the achieved production count calculation part of the operation result evaluation device is operable to, with respect to each order, calculate, based on the operation result information stored in the database, the achieved production count which is a number of corrugated paperboard boxes produced by the box making machine during the achieved operating time period; and the limited operating speed calculation part of the operation result evaluation device is operable to, with respect to each order, calculate, based on the order information stored in the database, the limited operating speed of the box making machine to be limited depending on each order.

According to this feature, the operation result evaluation system comprises the database for storing the operation result information in each order, in association with the order information of the order, so that it is possible to, after completion of production of corrugated paperboard boxes for a given order (e.g., after completion of production of corrugated paperboard boxes for the last order in a day), more efficiently calculate the achieved production count in each order and the limited operating speed of the box making machine in each order, with regard to corrugated paperboard boxes produced in a day.

Preferably, in the operation result evaluation system according to the first aspect of the present invention, the given database stored in the storage device further includes a database for storing the operation result information in each order generated by the operation result information generation part of the production management device, in association with the order information of the order, wherein the analytical information regarding the operating time period of the box making machine in each order generated by the analytical information generation part of the operation result evaluation device, and the comparative information generated by the comparative information generation part, are stored in the given database, in association with the order information and the operation result information each stored in the given database.

According to this feature, it is possible to, with respect to each order, store the order information, the operation result information, analytical information and the comparative information in the database, so that a user can arbitrarily obtain, e.g., the comparative information of a specific order.

Preferably, the operation result evaluation system according to the first aspect of the present invention further comprises a server device capable of transmitting and receiving information with respect to each of the production management device and the operation result evaluation device, and capable of transmitting information to the user terminal, wherein the information transmission control part of the operation result evaluation device is configured to cause the comparative information generated by the comparative information generation part configured to be transmitted to the user terminal via the server device.

Preferably, in the operation result evaluation system according to the first aspect of the present invention, the production management device is provided on a side of a producer who produces corrugated paperboard boxes using the box making machine, and the operation result evaluation device is provided on a side of a manufacturer of the box making machine.

According to this feature, the comparative information is transmitted to the producer of corrugated paperboard boxes (machine user) to allow the producer to figure out the efficiency in production of corrugated paperboard boxes, and wear or the like of a machine component of the box making machine. Further, the manufacturer of the box making machine (machine maker) can utilize information obtained from the operation result evaluation device, for, e.g., improvement, design change or the like of the box making machine produced by the manufacturer itself. Further, in a situation where the efficiency in production of corrugated paperboard boxes is deteriorated and there arises a concern about wear or the like of a machine component of the box making machine, the manufacturer of the box making machine (machine maker) can provide appropriate support, such as giving advice about inspection and maintenance of the box making machine, to the producer (machine user).

Preferably, in the above operation result evaluation system according to the first aspect of the present invention, the production management device is provided on a side of a producer who produces corrugated paperboard boxes using the box making machine, and the operation result evaluation device and the database are provided on a side of a manufacturer of the box making machine.

According to this feature, the comparative information is transmitted to the producer of corrugated paperboard boxes (machine user) to allow the producer to figure out the efficiency in production of corrugated paperboard boxes, and wear or the like of a machine component of the box making machine. Further, the manufacturer of the box making machine (machine maker) can utilize information obtained from the operation result evaluation device and the database stored in and the storage device, for, e.g., improvement, design change or the like of the box making machine produced by the manufacturer itself. Further, in the situation where the efficiency in production of corrugated paperboard boxes is deteriorated and there arises a concern about wear or the like of a machine component of the box making machine, the manufacturer of the box making machine (machine maker) can provide appropriate support, such as giving advice about inspection and maintenance of the box making machine, to the producer (machine user).

Preferably, in the operation result evaluation system according to the first aspect of the present invention, the production management device and the operation result evaluation device are provided on a side of a producer who produces corrugated paperboard boxes using the box making machine.

According to this feature, for example, the production management device and the operation result evaluation device can be constructed as an integral device. In this case, it becomes easier for the producer (machine user) to handle the operation result evaluation system.

Preferably, in the above operation result evaluation system according to the first aspect of the present invention, the production management device and the operation result evaluation device are provided on a side of a producer who produces corrugated paperboard boxes using the box making machine, and the database is provided on a side of a manufacturer of the box making machine.

According to this feature, for example, the production management device and the operation result evaluation device can be constructed as an integral device. In this case, it becomes easier for the producer of corrugated paperboard boxes (machine user) to handle the operation result evaluation system. On the other hand, the machine maker (the manufacturer of the box making machine) can utilize information obtained from the database stored in the storage device, for, e.g., improvement, design change or the like of the box making machine produced by the machine maker itself. Further, in the situation where the efficiency in production of corrugated paperboard boxes is deteriorated and there arises a concern about wear or the like of a machine component of the box making machine, the manufacturer of the box making machine (machine maker) can provide appropriate support, such as giving advice about inspection and maintenance of the box making machine, to the producer (machine user).

Preferably, in the above operation result evaluation system according to the first aspect of the present invention, the production management device, the operation result evaluation device and the database are provided on a side of a producer who produces corrugated paperboard boxes using the box making machine.

According to this feature, it becomes easier for the producer (machine user) to handle the operation result evaluation system.

Preferably, in the operation result evaluation system according to the first aspect of the present invention, the box making machine comprises: a sheet feeder for feeding corrugated paperboard sheets one-by-one; a printer for subjecting the fed corrugated paperboard sheet to printing; a creaser-slotter for subjecting the resulting corrugated paperboard sheet to creasing, slotting and formation of joint flaps; a folder-gluer for applying glue onto the joint flaps and then folding the resulting corrugated paperboard sheet along each crease to bondingly form a box-structured corrugated paperboard sheet; and a counter-ejector for counting a number of the box-structured corrugated paperboard sheets to form a batch consisting of a binding number of the box-structured corrugated paperboard sheets, and ejecting the batch.

In order to achieve the above objects, according to a third aspect of the present invention, there is provided an operation result evaluation device for use in a corrugated paperboard box making machine to, after completion of production of corrugated paperboard boxes for a given order, evaluate an operation result of the box making machine, based on order information which is information regarding an order for corrugated paperboard boxes, and operation result information which is information regarding the operation result of the box making machine. The operation result evaluation device comprises: an achieved production count calculation part configured to, with respect to each order, calculate, based on information regarding an achieved operating time period and information regarding a number of produced corrugated paperboard boxes, each obtained from a production management device for the box making machine, an achieved production count which is a number of corrugated paperboard boxes produced by the box making machine during the achieved operating time period; a limited operating speed calculation part configured to, with respect to each order, calculate, based on the order information, a limited operating speed of the box making machine to be limited depending on each order; a target operating time period calculation part configured to, with respect to each order, calculate a target operating time period, based on the calculated achieved production count and the calculated limited operating speed; a target and result comparison part configured to, with respect to each order, compare the calculated target operating time period with the achieved operating time period obtained from the production management device to calculate an additional operating time period which is a difference between the target operating time period and the achieved operating time period, and/or a time period achievement rate which is a quotient obtained by dividing the target operating time period by the achieved operating time period; an analytical information generation part configured to generate analytical information regarding the operating time period in each order, based on the calculated additional operating time period and/or the calculated time period achievement rate; a storage part configured to store a database regarding the generated analytical information regarding the operating time period for each order, and a production date included in the operation result information and the order information for each order, associated with the analytical information regarding the operating time period; a past-order identification part configured to refer to order information of past production dates in the database stored in the storage device to, with respect to each order, identify a past-order of a past production date having the same corrugated paperboard box specifications as those in the order information of the order; a past information acquisition part configured to acquire analytical information regarding a past operating time period for the identified past-order, in the database stored in the storage device, and a production date in the operation result information associated with the acquired analytical information; a comparative information generation part configured to, with respect to each order, associate the generated analytical information regarding the operating time period and the production date thereof, the acquired analytical information regarding the past operating time period and the past production date thereof, and the order information common in them, thereby generating comparative information; and an information transmission control part configured to cause the generated comparative information to be transmitted to a user terminal.

In the operation result evaluation device according to the third aspect of the present invention, it is possible to provide, to a user, information indicative of a relationship between an operation result of a repeat order which is an order having the same order information as that of a past-order, and an operating result of a past-order having the same corrugated paperboard box specifications as those of the repeat order, so as to allow the user to figure out the efficiency in production of corrugated paperboard boxes in each order after completion of production. Further, by providing, to the user, quantitative information regarding a loss dependent on the operating time period in each of current- and past-orders having the same corrugated paperboard box specifications, it is possible to allow the user to take notice of a sign of degradation of a machine component and recognize the necessity of inspection.

Effect of Invention

In the operation result evaluation system and device of the present invention, it is possible to provide, to a user, information indicative of a relationship between an operation result of a repeat order which is an order having the same order information as that of a past-order, and an operating result of a past-order having the same corrugated paperboard box specifications as those of the repeat order, so as to allow the user to figure out the efficiency in production of corrugated paperboard boxes in each order after completion of production. Further, by providing, to the user, quantitative information regarding a loss dependent on the operating time period in each of current- and past-orders having the same corrugated paperboard box specifications, or quantitative information regarding a loss dependent on the operating speed in each of current- and past-orders having the same corrugated paperboard box specifications, with respect to each order after completion of production, it is possible to allow the user to take notice of a sign of degradation of a machine component and recognize the necessity of inspection.

BRIEF DESCRIPTION OF THE DRAWINGS

FIG. 1 is a schematic side view showing the entire configuration of a corrugated paperboard box making machine to which an operation result evaluation system according to a first embodiment of the present invention is applied.

FIG. 6 is a chart showing one example of basic information of an order for use in the operation result evaluation system according to the first embodiment.

FIG. 7 is a chart showing one example of result information of the order to be generated by the operation result evaluation system according to the first embodiment.

FIG. 8 is a chart showing one example of analytical information of the order to be generated by the operation result evaluation system according to the first embodiment.

FIG. 9 is a chart showing one example of comparative information of the order to be generated by the operation result evaluation system according to the first embodiment.

FIG. 10 is a chart showing one modification of the comparative information of the order to be generated by the operation result evaluation system according to the first embodiment.

FIG. 11 is a chart showing one example of a matrix table defining a limited speed of the box making machine, for use in the operation result evaluation system according to the first embodiment.

FIG. 12 is a conceptual diagram for explaining a relationship between a sheet conveyance directional length and a conveyance interval in the box making machine in the first embodiment.

FIG. 13 is a chart showing comprehensive information of an order to be generated by the operation result evaluation system according to the first embodiment.

FIG. 14 is a chart showing one example of a database of past operation result information and analytical information to be referred to by the operation result evaluation device according to the first embodiment.

DETAILED DESCRIPTION OF THE PREFERRED EMBODIMENTS

Figure 2A:
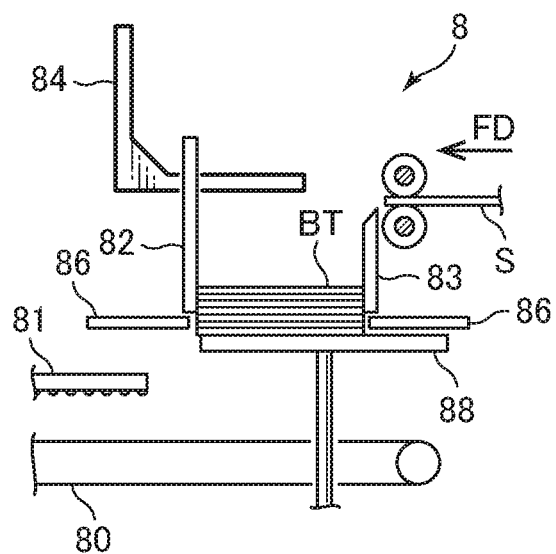
FIG. 2A is side view for explaining the configuration and a batch forming operation of a counter-ejector of the box making machine illustrated in FIG. 1.

First of all, with reference to FIG. 1, the entire configuration of a corrugated paperboard box making machine to which an operation result evaluation system according to a first embodiment of the present invention is applied will be described. FIG. 1 is a schematic side view showing the entire configuration of the box making machine to which the operation result evaluation system according to the first embodiment is applied.

As shown in FIG. 1, the reference sign 1 denotes a corrugated paperboard box making machine. This box making machine 1 comprises: a sheet feeder 2 for feeding corrugated paperboard sheets S one-by-one; a printer 3 for subjecting the fed corrugated paperboard sheet S to printing; a creaser-slotter 4 for subjecting the resulting corrugated paperboard sheet S to creasing, slotting and formation of joint flaps; a die cutter 5 for forming a punched area having a given shape in the resulting corrugated paperboard sheet S; a folder-gluer 6 for applying glue onto the joint flaps and then folding the resulting corrugated paperboard sheet S along each crease to bondingly form a box-structured corrugated paperboard sheet S; and a counter-ejector 8 for counting a number of the box-structured corrugated paperboard sheets S to form a batch consisting of a given number of the box-structured corrugated paperboard sheets S, and ejecting the batch. The reference sign 7 denotes a sheet divider for performing a sheet dividing operation in an order requiring one corrugated paperboard sheet to be cut into a plurality of small-size corrugated paperboard sheets. This sheet divider 7 is a special device which is generally not equipped in a normal corrugated paperboard box making machine. The reference sign 9 denotes a binder for binding each batch. This binder 9 is provided as incidental equipment of the box making machine 1.

Firstly, the sheet feeder 2 of the box making machine 1 comprises a suction box 20, a front gate 22 and a back guide 23, wherein the front gate 22 and the back guide 23 are provided on a sheet-feeding table 21 which forms an upper surface of the suction box 20. The front gate 22 and the back guide 23 are arranged to allow a plurality of corrugated paperboard sheets S produced by a corrugator (not shown) to be stacked therebetween. The front gate 22 is disposed to allow the stacked corrugated paperboard sheets S to be fed out one-by-one through a gap between the table 21 and the front gate 22. The back guide 23 is configured to be movable in a direction parallel to a feed-out direction (sheet conveyance direction) FD, whereby plural types of corrugated paperboard sheets S different in length in the sheet conveyance direction (sheet conveyance directional length) can be stacked between the front gate 22 and the back guide 23. Further, a suction device 24 is attached to the bottom of the suction box 20 to suction air inside the suction box 20.

The sheet feeder 2 further comprises a plurality of sheet-feeding rollers 25 arranged in parallel to each of the feed-out direction FD and a direction orthogonal to the feed-out direction FD, and a grate 26 which is a plate-like member configured to extend among the sheet-feeding rollers 25 and to be raisable and lowerable with respect to the sheet-feeding rollers 25. An outer peripheral surface of each of the sheet-feeding rollers 25 is provided with a urethane member for generating a frictional force with respect to the sheet S to increase a grip force for the sheet S.

Continuous sheet feeding by the sheet-feeding rollers 25 can be started by lowering the grate 26 downwardly with respect to the sheet-feeding rollers 25 to allow a lowermost one of the stacked corrugated paperboard sheets S to be brought into contact with the sheet-feeding rollers 25. In this state, rotation of the sheet-feeding rollers 25 is transmitted to the lowermost sheet S, and the stacked corrugated paperboard sheets S are fed out one-by-one toward feed rolls 27 ahead. The sheet S reaches the feed rolls 27 is fed out to the printer 3 according to rotation of the feed rolls 27. An outer peripheral surface of each of the feed rolls 27 is provided with a rubber member for generating a frictional force with respect to the sheet S to increase a grip force for the sheet S.

On the other hand, when the grate 26 is raised upwardly with respect to the sheet-feeding rollers 25, the lowermost sheet S is brought into non-contact with the sheet-feeding rollers 25, so that rotation of the sheet-feeding rollers 25 is not transmitted to the lowermost sheet S, and thereby the sheet feeding is stopped.

Secondly, the printer 3 comprises a plurality of (in this embodiment, two) printing units 30, 32 for subjecting the fed corrugated paperboard sheet S to printing. Each of the printing units 30, 32 comprises a printing cylinder (34, 36) having an outer peripheral surface to which a printing plate 38 is attached. When each of the printing cylinders 34, 36 is rotated 360-degree in accordance with (basically, in synchronization with) a conveyance speed of the corrugated paperboard sheet S, a given design will be printed at a given position of the corrugated paperboard sheet S by the printing plates 38. The printed sheet S is suppled to the creaser-slotter 4. In the event of an order change, an operator can replace the printing plate 38 with another printing plate having a printing pattern conforming to a new order.

Thirdly, the creaser-slotter 4 comprises a creaser unit 40 and a slotter unit 42. The creaser unit 40 comprises a pair of creasing rolls arranged one-above-the-other to perform creasing. The slotter unit 42 comprises: an upper slotter to which a slotter blade is attached; and a lower slotter formed with a groove fittingly engageable with the slotter blade to perform slotting. The creaser-slotter 4 is configured to subject the printed corrugated paperboard sheet S to creasing and slotting through the creaser unit 40 and the slotter unit 42, and formation of joint flaps, and supply the processed corrugated paperboard sheet S to the die cutter 5.

Fourthly, the die cutter 5 comprises a die cylinder 50 and an anvil cylinder 52. A punching die 54 for subjecting the supplied corrugated paperboard sheet S to punching is attached to a wooden form made of veneer plywood or the like, and then this wooden form is attached to an outer peripheral surface of the die cylinder 50. The punching die 54 is disposed to allow a desired area of the corrugated paperboard sheet S being continuously conveyed to be subjected to punching. In the event of an order change, the operator can replace the punching die 54 with another punching die having a punching pattern conforming to a new order.

Fifthly, the folder-gluer 6 comprises a guide rail 60 along the sheet conveyance direction of the punched corrugated paperboard sheet S. Two loop-shaped conveyance belts 62 arranged side-by-side in a direction parallel to the sheet conveyance direction are provided just above the guide rail 60. With a view to generating a frictional force with respect to the sheet S to increase a grip force for the sheet S, a surface layer of each of the conveyance belts 60 is made of rubber. The folder-gluer 6 further comprises a glue supply device 64, a bending bar 66 and a folding belt 68, which are arranged along the guide rail 60 and the conveyance belts 62.

The folder-gluer 6 is operable to support and convey the corrugated paperboard sheet S formed with creases and joint flaps, by the guide rail 60 and the conveyance belts 62. During the conveyance of the sheet S, the folder-gluer 6 is operable to apply glue onto the joint flaps by the glue supply device 64, and then bend the glue-applied sheet S by the bending bar 66. Further, the folder-gluer 6 is operable to fold the bent sheet S by the folding belt 68 to bond the joint flaps together, thereby producing a box-structured corrugated paperboard sheet S.

Sixthly, the counter-ejector 8 is operable to count the number of the box-structured corrugated paperboard sheets S sequentially supplied from the sheet divider 7 to form a batch BT consisting of a given number (binding number) of the box-structured corrugated paperboard sheets S. The formed batch BT is ejected toward the binder 9 connected to a downstream end of the box making machine 1 by a lower conveyer 80 by the aftermentioned lower conveyer 80, and the binder 9 is operable to bind the conveyed batch BT together for transportation. The counter-ejector 8 is equipped with a photoelectric sensor (not shown) for counting the number of the box-structured corrugated paperboard sheets S being conveyed.

With reference to FIG. 1 and FIGS. 2A to 2E, the configuration of the counter-ejector 8 will be described in detail below. FIGS. 2A to 2E are side views for explaining the configuration and a batch forming operation of the counter-ejector of the box making machine illustrated in FIG. 1.

As shown in FIG. 1 and FIGS. 2A to 2E, the counter-ejector 8 comprises a lower conveyer 80, an upper conveyer 81, a front contact plate 82, a correction plate 83, a main ledge 84, a pair of auxiliary ledges 86, and a lifter 88.

The front contact plate 82 is disposed displaceably in a forward-rearward direction to come into contact with a leading edge of the box-structured corrugated paperboard sheet S conveyed in the sheet conveyance direction FD, and positioned in the forward-rearward direction (sheet conveyance direction) such that a distance with respect to the correction plate 83 is set to a value conforming to a sheet conveyance directional dimension of the box-structured corrugated paperboard sheet S. This allows the box-structured corrugated paperboard sheets S to be sequentially stacked between the front contact plate 82 and the correction plate 83, while a trailing edge of each of the box-structured corrugated paperboard sheets S is brought into contact with the correction plate 83.

The main ledge (separating member) 84 has an L shape, and is configured to be movable in an upward-rearward direction and in the forward-rearward direction (rightward-leftward direction, in side view) by a support mechanism including a not-shown drive motor. The main ledge 84 is operable to separate a given number of box-structured corrugated paperboard sheets S inside the counter-ejector 8 by utilizing a sheet conveyance directional interval between adjacent ones of the box-structured corrugated paperboard sheets S fed in the counter-ejector 8 one-by-one from the upstream stations, and a time interval therebetween. The main ledge 84 is also operable to press down the box-structured corrugated paperboard sheets S on a per-batch basis.

Each of the pair of auxiliary ledges 86 is disposed beneath a respective one of the front contact plate 82 and the correction plate 83, and configured to be movable in the forward-rearward direction. Specifically, these auxiliary ledges 86 are configured to be moved in directions causing them to come close to each other to support a lower surface of the box-structured corrugated paperboard sheet S, and moved in directions causing them to come away from each other to place the box-structured corrugated paperboard sheet S on the lifter 88.

The lifter 88 is configured to be movable in the upward-downward direction. Specifically, the lifter 88 is configured to be lowered to pass a batch of the box-structured corrugated paperboard sheets S to the lower conveyer 80. The lower conveyer 80 is operable to send the batch BT toward the binder 9 in cooperation with the upper conveyer 94.

With reference to FIGS. 2A to 2E, the operation of the counter-ejector 8 will be described below.

First of all, as shown in FIG. 2A, the main ledge 84 is kept in a standby state at an uppermost position free of interference with the box-structured corrugated paperboard sheets S. This standby state will be maintained until the number counted by the not-shown photoelectric sensor reaches a given number (binding number) predetermined with respect to each order.

Figure 2B:
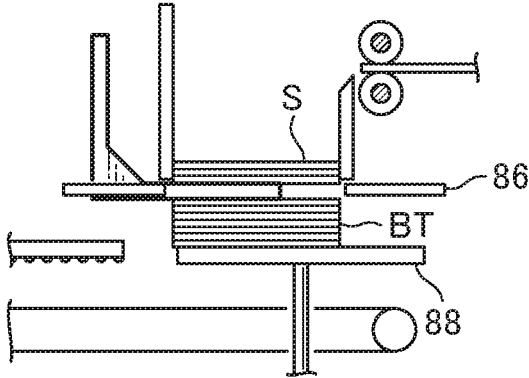
FIG. 2B is side view for explaining the configuration and a batch forming operation of a counter-ejector of the box making machine illustrated in FIG. 1.

Subsequently, as shown in FIG. 2B, when the counted number reaches the given number, the main ledge 84 is lowered. More specifically, the main ledge 84 is lowered just after a last sheet S constituting a preceding batch BT is fed in and before a first sheet S constituting a next batch is fed in. In this way, the main ledge 84 is inserted between an upper surface of the last sheet in the preceding batch and a lower surface of the first sheet in the next batch, thereby separating a given number of box-structured corrugated paperboard sheets S to form a batch BT consisting of the given number of the sheets S. Further, at almost the same time the batch BT is formed, the auxiliary ledges 86 are moved in directions causing them to come close to each other.

Figure 2C:
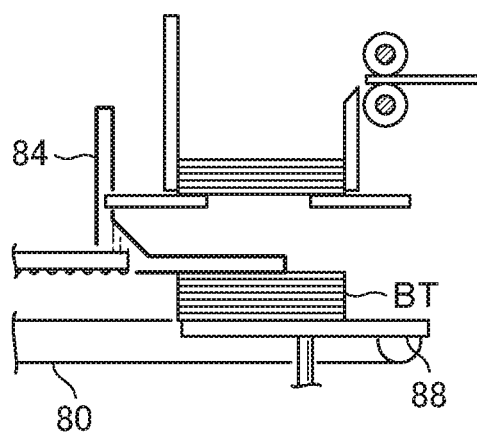
FIG. 2C is side view for explaining the configuration and a batch forming operation of a counter-ejector of the box making machine illustrated in FIG. 1.
Figure 2D:
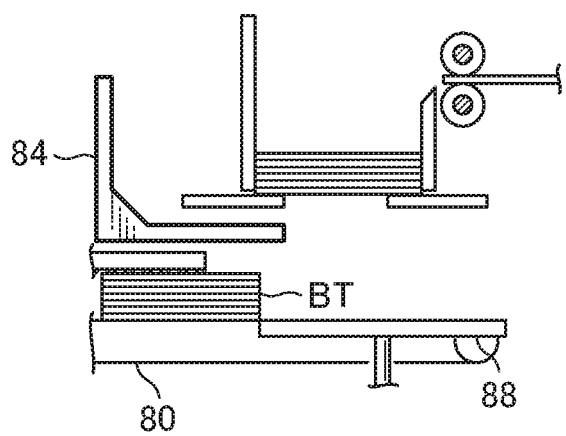
FIG. 2D is side view for explaining the configuration and a batch forming operation of a counter-ejector of the box making machine illustrated in FIG. 1.
Figure 2E:
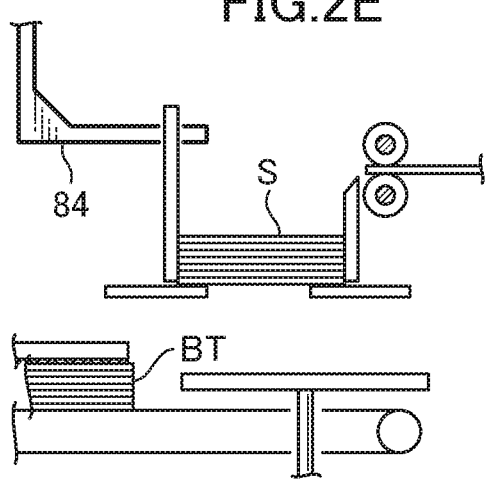
FIG. 2E is side view for explaining the configuration and a batch forming operation of a counter-ejector of the box making machine illustrated in FIG. 1.

Subsequently, as shown in FIG. 2C, in a state in which the batch BT is pressed down by the main ledge 84, the lifter 88 is lowered to a position of the lower conveyer 80 to pass one or more sheets constituting the next batch, placed on an upper surface of the main ledge 84, to the auxiliary ledges 86. Further, as shown in FIGS. 2D and 2E, the batch BT is passed from the lifter 88 to the lower conveyer 80, and then the main ledge 84 is moved to the uppermost standby position.

Figure 3:
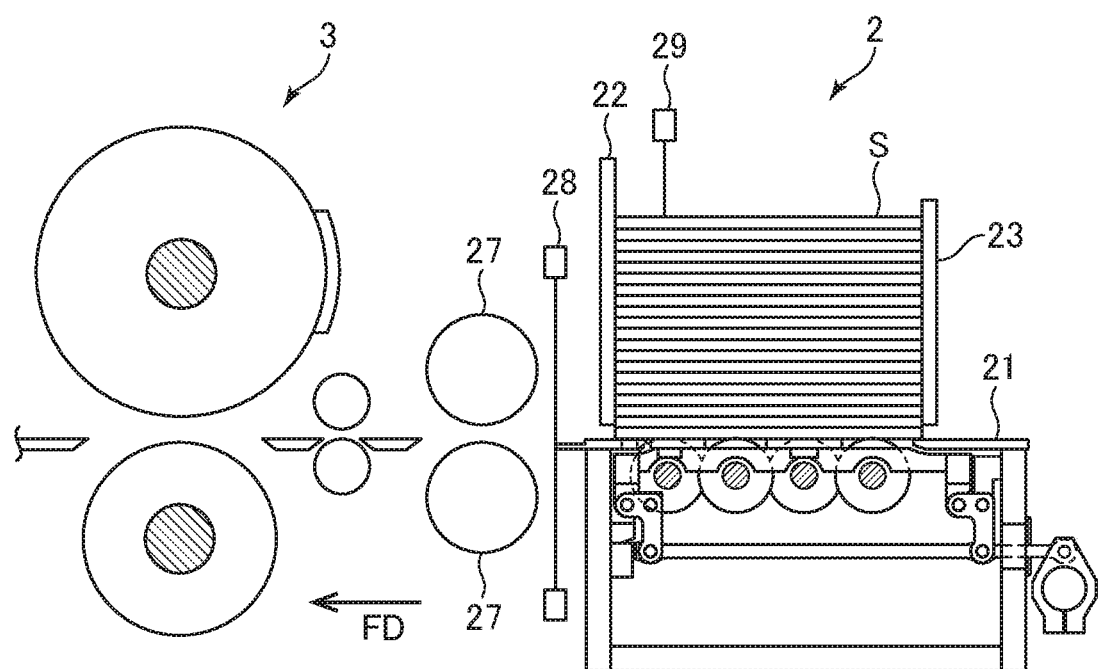
FIG. 3 is a side view showing sensors provided in a sheet feeder of the box making machine illustrated in FIG. 1.

Next, with reference to FIG. 3, a sensor for counting a production count of corrugated paperboard boxes by the box making machine 1 will be described. FIG. 3 is a side view showing sensors provided in the sheet feeder of the box making machine illustrated in FIG. 1.

As shown in FIG. 3, the sheet feeder 2 is provided with a production count counting sensor 28 disposed at a position downstream of the front gate 22 and upstream of the feed rolls 27. This production count counting sensor 28 is a photoelectric sensor configured to detect each of the sheets S fed out from the sheet feeder 2 one-by-one, and count a production count (the number of corrugated paperboard sheets actually fed out and produced into corrugated paperboard boxes).

Alternatively, the production count may be counted using a detection signal from the aforementioned photoelectric sensor (not shown) provided in the counter-ejector 8.

As shown in FIG. 3, the sheet feeder 2 is further provided with a sheet presence/absence detecting sensor 29 disposed at a position just above the sheet-feeding table 21 and upstream of the front gate 22. This sheet presence/absence detecting sensor 29 is a photoelectric sensor configured to emit signal light downwardly toward an upper surface of the sheet-feeding table to detect the presence or absence of the sheet S on the sheet-feeding table 21.

Here, the box making machine 1 is configured such that plural corrugated paperboard sheets S whose number is preliminarily set based on each order are automatically fed and stacked on the sheet-feeding table 21 of the sheet feeder 2. Further, the box making machine 1 may be configured such that, for example, when it is detected that the sheets S on the sheet-feeding table 21 run out in a situation where the after-mentioned lot termination switch is in an ON state, the operation of the box making machine in each order is automatically stopped, on the assumption that production of plural corrugated paperboard boxes whose number is preliminarily set based on each order is completed.

Figure 4:
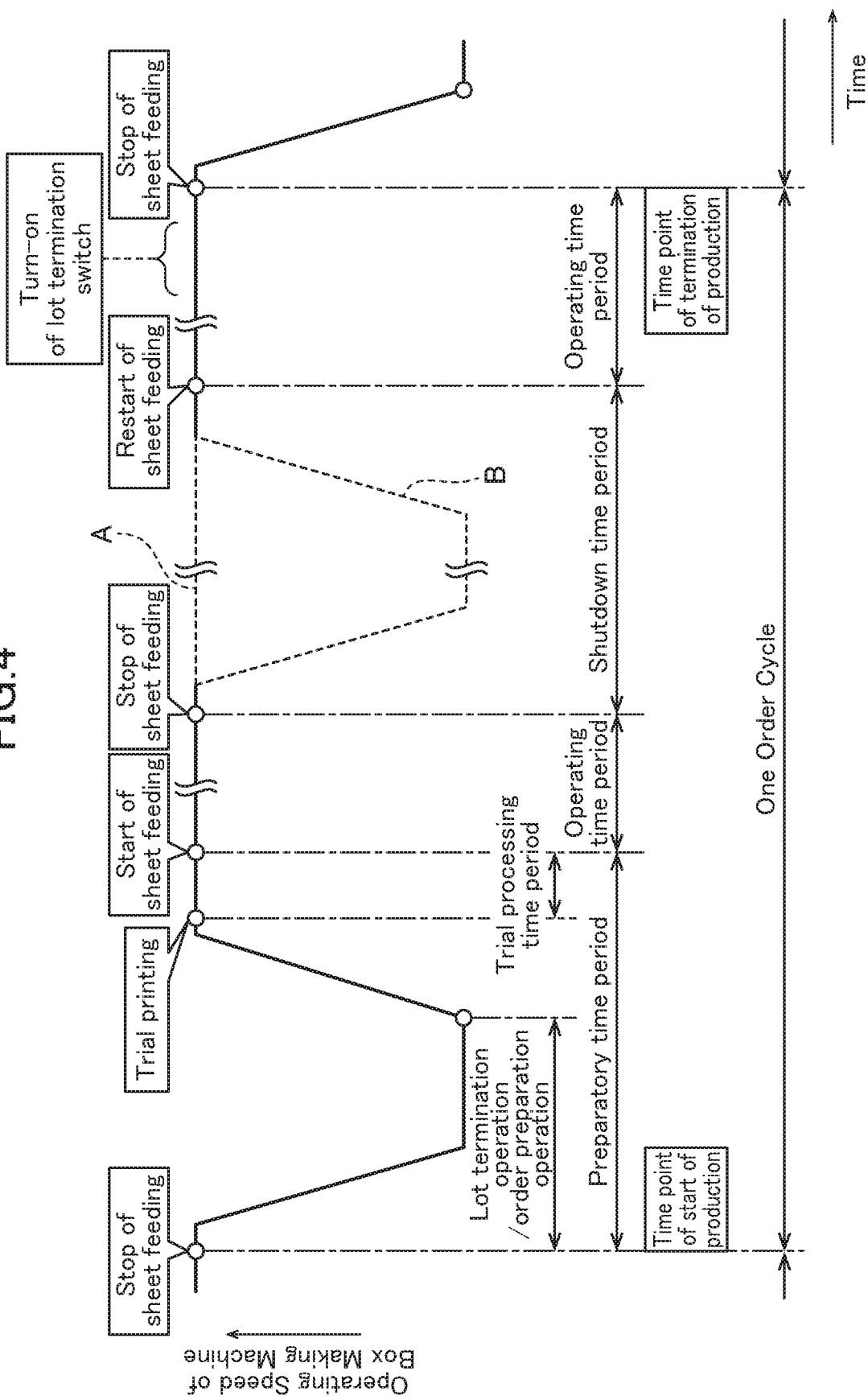
FIG. 4 is a time chart showing a basis operation of the box making machine for explaining the flow of production of corrugated paperboard boxes in one order cycle and the concept of production time period, for use in the operation result evaluation system according to the first embodiment.

Next, with respect to FIG. 4, the flow of production of corrugated paperboard boxes in one order cycle and the concept of production time period, in the box making machine in the first embodiment will be described. FIG. 4 is a time chart showing a basis operation of the box making machine for explaining the flow of production of corrugated paperboard boxes in one order cycle and the concept of production time period, for use in the operation result evaluation system according to the first embodiment.

First, as shown in FIG. 4, in this embodiment, in a case where the box making machine 1 produces plural corrugated paperboard boxes whose specifications and scheduled count (volume ordered from a customer) are different depending on each order, a time point when production for a preceding order has been completed is deemed to be coincident with a time point of start of production for a current order. Similarly, a time point of completion of production for the current order is deemed to be coincident with a time point of start of production for the next order.

Here, in this embodiment, the term "production time period" means the entire time period relating to production of corrugated paperboard boxes, and a time period of one order cycle, as shown in FIG. 4 is equivalent to the production time period of the order. This production time period is roughly classified into three time periods; an "operating time period" which is a time period of a step in which corrugated paperboard sheets S are continuously fed and processed into corrugated paperboard boxes (box-structured corrugated paperboard sheets); a "preparatory time period" which is a time period of a step in which the continuous sheet feeding is stopped, and an order change work (positioning, replacement of the printing plate, etc., trial processing, inspection and adjustment) is performed, and a "shutdown time period" which is a time period of a step in which the continuous sheet feeding is stopped, and the order change work is not performed.

In this embodiment, a time point when the production flow enters a preparatory step is defined as a time point of start of production for the certain order, as shown in FIG. 4. In this embodiment, in the preparatory step, firstly, after the sheet feeding of corrugated paperboard sheets S by the sheet feeder 2 is stopped, positioning of movable members (movable machine components) of, e.g., adjustment of a gap between the feed rolls and positioning of processing tools such as a slitter, is automatically performed under machine control. Secondly, manual works by an operator (worker) such as replacement of the printing plate are performed. Thirdly, trial processing is performed.

The first preparatory sub-step (first order change work) is performed, for example, by (1) preliminarily turning on a lot termination switch for automatically performing a series of operations from completion of production for a preceding order to positioning of each unit, under machine control, or by (2) manually pushing a sheet-feeding stop switch for stopping the continuous sheet feeding, to stop the sheet feeding, thereby terminating the production for the preceding order, and after manually turning off a main motor switch which is a power switch of a motor for driving rotors such as the sheet-feeding rollers 25 and the printing cylinder 34 for conveying and processing corrugated paperboard sheets S, manually turning on an order change switch for starting positioning of the movable members on a machine control basis during an order change.

In the second preparatory sub-step (second order change work), in a state in which the main motor switch is manually turned off to stop the feeding of corrugated paperboard sheets S and shut down the box making machine 1, an operator (worker) performs a preparatory work necessary to start production for a new order. Examples of the preparatory work to be performed by the operator include: work of detaching the printing plate already attached to each of the printing cylinders 34, 36 of the printing units 30, 32 of the printer 3, and then attaching another printing plate conforming to a print pattern for a current order; work of replacing ink to be supplied to the printing units 30, 32 with another ink conforming to print color; and work of attaching a wooden form of the punching die 54 conforming to a punching shape for the current order, to the die cylinder 50 of the die cutter 5, in the same manner as that in the replacement of the printing plate.

Here, for example, in a first order for which the box making machine 1 is first started up in a day at a time point of start of production, the preparatory work is performed by appropriately changing the order between the first preparatory sub-step and the second preparatory sub-step, on an as-needed basis.

Subsequently, in the third preparatory sub-step (third order change work/trial processing), after the first and second preparatory works, the operator manually turns on the main motor switch to start up the box making machine 1, and then manually set the operating speed (sheet conveyance speed) using switches or a touch panel display. Specifically, for example, the operator manipulates an acceleration/deceleration switch for continuously increasing or reducing the operating speed, and a single-sheet feeding switch for feeding only one of the sheets S stacked on the sheet-feeding table 21, to subject the fed sheet S to trial processing, and inspects the resulting corrugated paperboard box (box-structured corrugated paperboard sheet). Then, the operator adjusts the operating speed so as to stably obtain a good product.

Subsequently, upon completion of the preparatory step, the production flow enters an operation step of producing corrugated paperboard boxes, while continuously feeding corrugated paperboard sheets S at the operating speed adjusted in the above manner. In this operating step, the operator manipulates a sheet-feeding start switch for triggering the operation of continuously feeding corrugated paperboard sheets S stacked on the sheet-feeding table 21 on-by-one, thereby starting production under continuous sheet feeding at the adjusted operating speed.

Subsequently, upon completion of production of corrugated paperboard boxes (box-structured corrugated paperboard sheets) whose number corresponds to a production count set based on an order-designated volume, the operator manipulates the sheet-feeding stop switch for stopping the continuous sheet feeding, to stop the sheet feeding, and shut down the box making machine 1. Alternatively, the operator preliminarily inputs a sheet-feeding stop sheet count, using the control panel, to allow the continuous sheet feeding to be automatically stopped upon completion of feeding of corrugated paperboard sheets S whose number corresponds to the preset sheet-feeding stop sheet count.

Subsequently, a preparatory work for production for the next order is started. As the preparatory work, the operator turns off the main motor switch, and further pushes the order change switch, to start positioning of the movable members of the box making machine for the next order. Alternatively, the lot termination switch may be preliminarily turned on during the continuous sheet feeding for the current order, as mentioned above. In this case, at the time when the sheets on the sheet-feeding table 21 run out, the continuous sheet feeding is automatically stopped, and the main motor is automatically turned off. Further, positioning of the movable members is automatically started.

Figure 5:
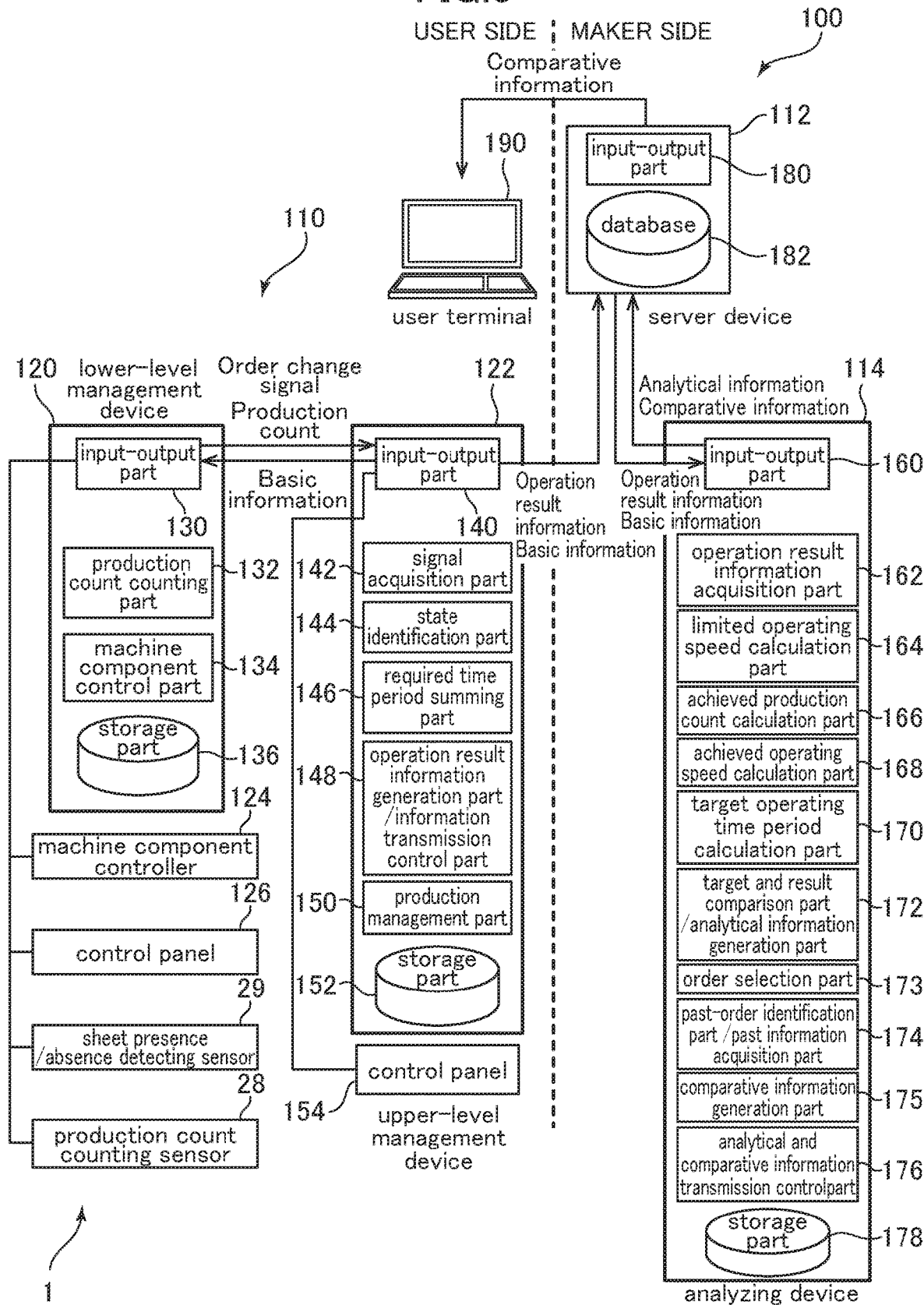
FIG. 5 is a block diagram showing a schematic configuration of the operation result evaluation system according to the first embodiment.

Next, with reference to FIGS. 5 and 6, a schematic configuration of the operation result evaluation system according to the first embodiment, and basic information of an order for use in the operation result evaluation system will be described. FIG. 5 is a block diagram showing the schematic configuration of the operation result evaluation system according to the first embodiment, and FIG. 6 is a chart showing one example of the basic information of an order for use in the operation result evaluation system according to the first embodiment.

As shown in FIG. 5, the reference sign 100 denotes an operation result evaluation system for use in the box making machine 1, according to this embodiment. The operation result evaluation system 100 for use in the box making machine 1 is provided on the side of a user of the box making machine 1 (on the side of a producer which produces corrugated paperboard boxes using the box making machine 1), and comprises: a production management device 110 for controlling each machine components of the box making machine 1 and performing production management of the box making machine 1; a server device 112 provided on the side of a maker (on the side of a manufacturer of the box making machine) to perform communication with respect to external devices, and comprising a database (storage device) for storing therein given data; and an analyzing device 114 (operation result evaluation device) 114 connectable to the server device 112. Here, the communication of the server device 112 with respect to external devices is performed via the Internet, crowd service, company's LAN or the like.

The production management device 110 is connected to the box making machine 1, and comprises: a lower-level management device 120 for controlling each machine component of the box making machine 1 in accordance with to basic information in each order as shown in FIG. 6; and an upper-level management device 122 for generally managing production in the box making machine 1. In this embodiment, the lower-level management device 120 is incorporated in the box making machine 1, and the upper-level management device 122 is provided separately from the box making machine 1.

In this embodiment, the term "basic information" means order information for producing corrugated paperboard boxes for each order, using the box making machine 1, wherein the basic information (order information) includes information regarding a product code, a sheet size, a binding number, a scheduled count (volume ordered from a customer) and the like, as shown in FIG. 6. In this embodiment, the term "product code" means a code indicative of corrugated paperboard box specifications, wherein a common product code is used for corrugated paperboard boxes having the same specifications (such as sheet size, flute, box shape and binding number). In this case, a common product code is used even when a scheduled number (volume ordered from a customer) is different among orders.

Firstly, with reference to FIGS. 5 and 6, the lower-level management device 120 of the production management device 110 will be described in detail.

The lower-level management device 120 in this embodiment is a device configured to control operations of the machine components 2 to 6 and 8 of the box making machine 1 in accordance with the basic information of each order received from the upper-level management device 122. For this purpose, the lower-level management device 120 is connected with a controller 124 for controlling the machine components 2 to 6 and 8 of the box making machine 1; a control panel 126 including the switches and the touch panel display described above in connection with FIG. 4; the aforementioned production count counting sensor 28; and the aforementioned sheet presence/absence detecting sensor 29, as shown in FIG. 5.

The lower-level management device 120 comprises: an input-output part 130 to transmit and receive data (information) with respect to the upper-level management device 122; a production count counting part 132 to count a production count in real time, based on a detection signal from the production count counting sensor 28; and a machine component control part 134 to send a signal to the controller 124 so as to, with respect to each order, control the operations of the machine components 2 to 6 and 8, such as operations necessary for conveyance and processing of each corrugated paper board sheet S, and positioning operation during order change. A result of counting of the production count by the production count counting part 132 is sent to the upper-level management device 122 in real time.

The lower-level management device 120 further comprises a storage part 136. The storage part 136 is configured to store therein the basic information (FIG. 6) of each order received from the upper-level management device 122, at least during execution of the received order, and temporarily store therein the result of counting of the production count by the production count counting part 132. Further, the storage part 136 stores therein data regarding a timing at which an order change signal is transmitted and received with respect to the upper-level management device.

The touch panel display 126 of the box making machine 1 is configured such that the scheduled count in each order (order-designated volume), the sheet-feeding stop sheet count, the operating speed set by the operator, the after-mentioned limited operating speed in each order and others are displayed thereon. The storage part 136 further stores therein data regarding the after-mentioned matrix table (see FIG. 1), and the lower-level management device 120 is operable to use the data regarding this matrix table to calculate a limited operating speed in each order, in the same manner as the after-mentioned manner in the analyzing device 114.

The lower-level management device 120 is operable, upon completion of production for a current order, to send the order change signal to the upper-level management device 122. When the upper-level management device 122 receives the order change signal, the upper-level management device 122 is operable to send basic information of the next order (FIG. 8) to the lower-level management device 120. This order change signal is sent when corrugated paperboard sheets S on the sheet-feeding table run out in the situation where the lot termination switch is in the ON state, or when the operator manually pushes the order change switch.

Secondly, with reference to FIGS. 5 and 7, the upper-level management device 122 of the production management device 110 in this embodiment will be described in detail. FIG. 7 is a chart showing one example of result information of the order to be generated by the operation result evaluation system according to the first embodiment.

The upper-level management device 122 in this embodiment is a device configured to cause the box making machine 1 to execute production of corrugated paperboard boxes for a large number of orders, in a predetermined sequence.

As shown in FIG. 5, the upper-level management device 122 comprises: an input-output part 140 to transmit and receive data (information) with respect to the lower-level management device 120 and the server device 112; a signal acquisition part 142 to acquire the order change signal and the result of counting of the production count, in real time from the lower-level management device 120; a state identification part 144 to identify each of the operation, shutdown and preparatory states, based on the signals acquired by the signal acquisition part 142; and a required time period summing part 146 to sum durations of each of the operation, shutdown and preparatory states identified by the state identification part 144, in real time.

More specifically, the state identification part 144 is operable to identify each of three states of the box making machine 1: the state in the "operating time period" (operation state); the state in "shutdown time period" (shutdown state); and the state in the "preparatory time period" (preparatory state), and the required time period summing part 146 is operable to sum a required time period of each of the states. In this embodiment, a combination of the state identification part 144 and the required time period summing part 146 serves as a means to calculate an achieved operating time period.

Here, a method of calculating the achieved operating time period by the state identification part 144 and the required time period summing part 146 will be described.

In this embodiment, when the number of corrugated paperboard sheets S detected during conveyance based on a result of counting of the production count by the aforementioned sensors (28, 29) becomes two or more per 5 seconds, the state identification part 144 operates to determine that the continuous sheet feeding is started, and the "operating time period" is started at the time point of detection of the first sheet of the continuous sheet feeding. On the other hand, when the number of detected corrugated paperboard sheets S is determined not to be two or more per 5 seconds, the state identification part 144 operates to determine that the continuous sheet feeding is stopped, and terminate the "operating time period" at the time point of detection of the last sheet of the continuous sheet feeding.

As one modification, the operating time period may be started at the time point when the operator manipulates the sheet-feeding start switch as mentioned above. Further, the operating time period may be terminated at the time point when the operator manipulates the sheet-feeding stop switch as mentioned above.

In this embodiment, the state identification part 144 operates to start the preparatory time period at the time point of receiving of the order change signal. Further, the state identification part 144 operates to terminate the preparatory time period at the same time point as that of the start of the operating time period.

The time period during which the number of detected corrugated paperboard sheets S is not two or more per 5 seconds is deemed as a state in which the continuous sheet feeding is stopped (broken line A in FIG. 4), or determined as a shutdown state in which the continuous sheet feeding is actually stopped (broken line B in FIG. 4), and defined as the shutdown time period. In the situation where this shutdown state (shutdown time period) is detected, when the number of corrugated paperboard sheets S detected based on the result of counting of the production count by the sensors becomes two or more per 5 seconds, the state identification part 144 operates to determine that the continuous sheet feeding is restarted, and consider the detection timing as the time point of restart of the operating time period. In the case where the operating time period is divided into a plurality of sub-time periods in one order cycle, the sum of the sub-time periods is defined as the operating time period. This handling is also applied to the preparatory time period and the shutdown time period. It should be noted here that the time point of start of the broken line B in FIG. 4 is, e.g., the time point when the sheet-feeding stop switch is pushed for emergency shutdown during the continuous sheet feeding.

As shown in FIG. 5, the upper-level management device 122 further comprises an operation result information generation part/information transmission control part 148, a production management part 150, and a storage part (database) 152.

The operation result information generation part/information transmission control part 148 is operable to generate operation result information in each order as shown in FIG. 7, in association with the basic information (FIG. 6) stored in the storage part 152, and store the operation result information in the storage part 152.

The operation result information generation part/information transmission control part 148 is also operable to cause the stored operation result information to be transmitted to the server device 112 via the input-output part 140. More specifically, the operation result information generation part/information transmission control part 148 is operable, when a power switch of the upper-level management device 122 is turned off, or when production in a day is completed, e.g., when a fixed time has come, to read out operation result information about production of the day from the storage part 152, and send the read-out operation result information to the server device 112 together with the basic information.

Here, as shown in FIG. 7, the operation result information includes, as information in each order, production date, the production count counting result acquired by the signal acquisition part 142, the achieved operating time period summed by the required time period summing part 146, an achieved shutdown time period, and achieved preparatory time period.

The production management part 150 is operable, when receiving the order change signal from the lower-level management device 120, to read out the basic information of the next order from a production management plan stored in the storage part 152, and send the read-out basic information of the next order to the lower-level management device 120.

The storage part 152 stores therein data about the production management plan including the basic information (FIG. 6) of each order, and data about the aforementioned operation result information (FIG. 7). Further, the storage part 152 is configured to store therein the production count counting result acquired by the signal acquisition part 142 in the form of two separated types of counting results: the number of corrugated paperboard sheets fed during one order cycle; and the number of corrugated paperboard sheets fed during the "preparatory time period" identified by the state identification part 144 (during the trial processing), as shown in FIG. 7.

The upper-level management device 122 is provided with a control panel 154 comprising a keyboard and a touch panel display. Through this control panel 154, the operator can perform production management for orders, such as change in the sequence of orders, addition or deletion of an order, or change in the basic information of each order.

Thirdly, with reference to FIGS. 5 and 12, the analyzing device 114 of the operation result evaluation system according to the first embodiment will be described in detail. FIG. 8 is a chart showing one example of analytical information of an order to be generated by the operation result evaluation system according to the first embodiment. FIG. 9 is a chart showing one example of comparative information of the order to be generated by the operation result evaluation system according to the first embodiment, and FIG. 10 is a chart showing one modification of the comparative information of the order to be generated by the operation result evaluation system according to the first embodiment. FIG. 11 is a chart showing one example of a matrix table defining a limited speed of the box making machine, for use in the operation result evaluation system according to the first embodiment, and FIG. 12 is a conceptual diagram for explaining a relationship between a sheet conveyance-directional length and a conveyance interval in the box making machine in the first embodiment.

The analyzing device 114 in the first embodiment is a device configured to calculate a target operating time period and a target operating speed (limited operating speed) based on the basic information and the operation result information of each order transmitted from the upper-level management device 122, and generate analytical information (FIG. 8) and comparative information (FIG. 9), based on the calculated operation target values and achieved values. In this embodiment, the analytical information and the comparative information are generated after completion of production in a day.

With reference to FIG. 5, a schematic configuration of the analyzing device 114 will be described.

As shown in FIG. 5, the analyzing device 114 in this embodiment comprises: an input-output part 160 to transmit and receive data (information) with respect to the server device 112; an operation result information acquisition part 162 to acquire the basic information (FIG. 6) and the operation result information (FIG. 7), from the server device 112; a limited operating speed calculation part (target operating speed setting part) 164 to calculate a limited operating speed of the box making machine 1 to be set with suspect to each order; an achieved production count calculation part 166 to calculate a production count during the operating time period as an achieved production count; an achieved operating speed calculation part 168 to calculate an achieved operating speed in each order, based on the acquired operation result information; and a target operating time period calculation part 170 to calculate the target operating time period in each order, based on the acquired operation result information and the calculated limited operating speed.

The analyzing device 114 in this embodiment further comprises: a target and result comparison part/analytical information generation part 172 to, with respect to each order, perform comparison between the achieved operating time period and the target operating time period to generate the analytical information including a result of the comparison, as shown in FIG. 8; an order selection part 173 to select an order for which comparative information is to be provided to the user, based on the aftermentioned additional operating time period and others calculated by the target and result comparison part/analytical information generation part 172; a past-order selection part/past information acquisition part 174 to search a database 182 to identify a past-order having the same product code as that of the order selected by the order selection part 173, among previously-produced orders (past-orders of past production dates), and acquire the analytical information of the identified past-order from the database 182; a comparative information generation part 175 to generate the comparative information as shown in FIG. 9, as record information about the analytical information of the order selected by the order selection part 173 and the analytical information of the past-order; and an analytical and comparative information transmission control part 176 to cause the analytical information (FIG. 8) and the comparative information (FIG. 9) to be read out from the storage part 156 and transmitted to the server device 112 via the input-output part 160 and further cause the comparative information to be transmitted from the server device 112 to a user terminal 190.

The analyzing device 114 further comprises a storage part (database) 178 in which the matrix table (FIG. 11) is stored. The storage part 178 also stores therein the analytical information (FIG. 8) of each order and the comparative information (FIG. 9) of the selected order.

With reference to FIGS. 5, 8 and 9, functions of the calculation parts and the information generation parts of the analyzing device 114 and information to be generated by the analyzer 114 will be described in detail.

The limited operating speed calculation part (target operating speed setting part) 164 is operable to calculate the limited operating speed in each order, based on a sheet conveyance directional dimension and a binding number included in the basic information (FIG. 6) and the matrix table (FIG. 11) stored in the storage part 178. Then, the limited operating speed calculation part 164 is operable to set the calculated limited operating speed in each order, as the target operating speed in each order. A method of calculating the limited operating speed using the matrix table will be described later.

The achieved production count calculation part 166 is operable, based on the operation result information (FIG. 7), to calculate the production count during the operating time period by subtracting a result of counting during the preparatory time period (count in the trial processing) from a result of counting during one order cycle. Here, the production count during the preparatory time period may be considered to fall within the margin of error, because it is several, and therefore a value obtained by adding the production count during the operating time period and the production count during the preparatory time period together, i.e., the result of counting during one order cycle, may be used as the achieved production count during the operating time period.

The achieved operating speed calculation part 168 is operable to calculate the achieved operating speed in each order by dividing the achieved production count during the operating time period of the box making machine 1 by the achieved operating time period included in the operation result information acquired through the operation result information acquisition part 162.

The target operating time period calculation part 170 is operable to, with respect to each order designating the day as the production date, calculate the target operating time period in each order by dividing the achieved production count during the operating time period by the limited operating speed calculated through the limited operating speed calculation part 164. This target operating time period is calculated as the shortest operating time period required on the assumption that plural corrugated paperboard boxes whose number is equal to a production count in an actual operating time period are produced at the limited operating speed.

The target and result comparison part/analytical information generation part 172 is operable to, with respect to each order designating the day as the production date: firstly, calculate the absolute value of a difference between the achieved operating time period included in the acquired operation result information and the calculated target operating time period, as an additional operating time period; secondly, calculate the ratio of the target operating time period to the achieved operating time period, as a time period achievement rate; thirdly, calculate the absolute value of a difference between the calculated achieved operating speed and the limited operating speed, as an operating speed difference; and, fourthly, calculate the ratio of the achieved operating speed to the limited operating speed, as a speed achievement rate. The comparison results such as the additional operating time period are stored, as the analytical information as shown in FIG. 8, in the storage part 178 together with the calculated limited operating speed and others. Further, the achieved operating speed calculated in the achieved operating speed calculation part 168 is also stored as the analytical information as shown in FIG. 8.

Here, the analytical information includes the calculated limited operating speed, the production count during the operating time period, the target operating time period, the additional operating time period, the time period achievement rate, the achieved operating speed, the operating speed difference, and the speed achievement rate, as shown in FIG. 8.

The order selection part 173 is operable to select an order for which the comparative information is to be provided to the user, based on the additional operating time period calculated by the target and result comparison part/analytical information generation part 172. In this embodiment, the order selection part 173 is configured to select an order having the largest value of the additional operating time period. Alternatively, the order selection part 173 may be configured to select an order having the smallest value of the time period achievement rate, the largest value of the operating speed difference, and/or the smallest value of the speed achievement rate.

The past-order identification part/past information acquisition part 174 is operable to search the database 182 using the product code of the order selected by the order selection part 173, thereby identifying a past-order having the same product code among previously-produced past-orders. The past-order identification part/past information acquisition part 174 is further operable to acquire the production date and the analytical information of the identified past-order from the database 182. In this embodiment, in a case where a plurality of past-orders are identified, such information may be acquired for all the past-orders, or may be acquired for only several past-orders in the order of late production date.

The comparative information generation part 175 is operable to associate each of the analytical information of the order selected by the order selection part 173 and the analytical information of the past-order identified by the past-order identification part/past information acquisition part 174 with a respective one of their production dates to generate the comparative information as shown in FIG. 9, as record information.

Here, the comparative information is generated such that it includes a part of the basic information and the operation result information, such as a the product code, the production date, and the production count, in addition to the additional operating time period in a current order (in this embodiment, the additional operating time period of an order selected by the order selection part 173 among plural orders in a day), the production date of a past-order having the same production code as that of (the same corrugated paperboard box specifications as those of) the selected order, and the past additional operating time period of the past-order, as shown in FIG. 9, so as to serve as information allowing the user to objectively recognize information about comparison between a past operation target and a past operation result, and information about comparison between a current operation target and a current operation result, with respect to each order. As one modification, instead of the product code, a product name (name of a box) may be used to identify an order, as shown in FIG. 10. Further, the comparative information may include values of the current achieved operating speed and the past achieved operating speed, as shown in FIG. 10, and these values themselves may be displayed on the user terminal 190, as will be described in detail later. Further, although, in this embodiment, information about the additional operating time period is generated as the comparative information as shown in FIG. 9, the time period achievement rate, the operation speed difference, the speed achievement rate and/or the achieved operating speed may be included in the comparative information, in place of or in addition to the additional operating time period.

The analytical and comparative information transmission control part 176 is operable to cause the analytical information (see FIG. 8) of each order designating the day as the production data, and the comparative information (see FIG. 9) including the past analytical information acquired by the past-order identification part/past information acquisition part 174 to be read out from the storage part 178, and transmitted to the server device 112. Further, the analytical and comparative information transmission control part 176 is operable to cause the analytical information and the comparative information to be stored in the storage part (database) 182 of the server device 112 and further cause the comparative information to be transmitted to the user terminal 190 via the server device 112. Here, the basic information, the operation result information generated in the upper-level management device 122, the analytical information generated in the analyzing device 114 and the comparative information may be stored in the storage device 178 in association with each other with respect to each order.

Here, with reference to FIGS. 2, 11 and 12, the method of calculating the limited operating speed using the matrix table by the limited operating speed calculation part 164 will be described.

The limited operating speed calculation part 164 is operable to, with respect to each order designating the day as the production data included in the operation result information, calculate the limited operating speed by referring to the matrix table preliminarily stored in the storage part 178, for a combination of the sheet conveyance directional dimension and the binding number included in the basic information. One example of the matrix table is shown in FIG. 11. In this matrix table, based on specifications of the box making machine, values of the limited operating speed of the box making machine 1 to be limited depending on each order (the maximum speed in each order) are predetermined with respect to various combinations of values of the sheet conveyance directional dimension and values of the binding number. Alternatively, after delivery of the box making machine, a sheet-feeding test may be conducted with respect to each of the combinations of values of the sheet conveyance directional dimension and values of the binding number, to define the matrix table based on values of the limited operating speed derived by a result of the test. In this embodiment, the limited operating speed of the box making machine 1 is set to a maximum speed which fulfills a series of operations (see FIGS. 2A to 2E) of the counter-ejector in a downstream station in which a given number of box-structured corrugated paperboard sheets S are separated by the main ledge 84 to form a batch, and ejected.

Here, a reason that the sheet conveyance directional dimension and the binding number put a restriction on the maximum speed of the box making machine 1 will be described.

Corrugated paperboard sheets S are conveyed, e.g., in synchronization with rotation of the printing cylinder 34. In this case, basically, one corrugated paperboard sheet S is fed per 360-degree rotation of the printing cylinder. In this process, as shown in FIG. 12, an inter-sheet interval in the forward-rearward direction (in FIG. 12, C1) in a case where the sheet conveyance directional dimension is relatively large (in FIG. 12, W1), with respect to a circumferential length of the printing cylinder as shown in FIG. 12, becomes smaller than the inter-sheet interval (in FIG. 12, C2) in a case where the sheet conveyance directional dimension is relatively small (in FIG. 12, W2). Therefore, in the case where the sheet conveyance directional dimension is relatively large, a time interval after a last sheet of a preceding batch is fed in through until a first sheet of the next batch is fed in becomes relatively short. Thus, in order to reliably separate a given member of box-structured corrugated paperboard sheets by the counter-ejector, the limited operating speed is set to be slower as the sheet conveyance directional length becomes larger.

Further, in a case where the binding number is relatively small, the series of operations of the counter-ejector 8 in which a given number of box-structured corrugated paperboard sheets S are separated to form a batch, and ejected need to be frequently repeated, as compared with a case where the binding number is relatively large. Thus, in order to reliably perform such a series of operations, the limited operating speed is set to be slower as the binding number becomes smaller.

Fourthly, with reference to FIGS. 5, 13 and 14, a schematic configuration of the server device 112 and the database 182 thereof will be described. FIG. 13 is a chart showing comprehensive information of an order to be generated by the operation result evaluation system according to the first embodiment, and FIG. 14 is a chart showing one example of a database of past operation result information and analytical information to be referred to by the operation result evaluation system according to the first embodiment.

As shown in FIG. 5, the server device 112 comprises an input-output part 180 to transmit and receive data (information) with respect to the upper-level management device 122 and the analyzing device 114, and the database (storage part) 182 storing therein data as shown in FIG. 11.

The server device 112 is configured to receive the basic information (FIG. 6) and the operation result information (FIG. 7) from the upper-level management device 122, and store the received information in the database 182. In this embodiment, the operation result information acquisition part 162 of the analyzing device 114 is operable to acquire the basic information and the operation result information for previous 5000 orders, stored in the database 182.

Data to be stored in the data base (storage part) 182 includes data for comprehensively managing the basic information, the operation result information and the analytical information relating to all orders previously subjected to production, as shown in FIG. 13. Data as shown in FIG. 13 is data about comprehensive information obtained by associating the analytical information sent from the analyzing device 114 with the basic information and the operation result information received from the upper-level management device 122, and serves as database capable of being referred to by the user. The comparative information sent from the analyzing device 114 is included in this database.

As shown in FIG. 14, data to be stored in the database (storage device) 182 includes record data about all orders preciously subjected to production, wherein the record data is referable as a database. The database as shown in FIG. 14 includes the order information such as the product code, the operation result information such as the production count, and the analytical information and comparative information regarding the operating time period and/or the operating speed.

As one modification, the comprehensive information as shown in FIG. 13 and the record data as shown in FIG. 14 may be stored in the storage part (storage device) 178 of the analyzing device 114 together with the matrix table (FIG. 11).

Figure 15:
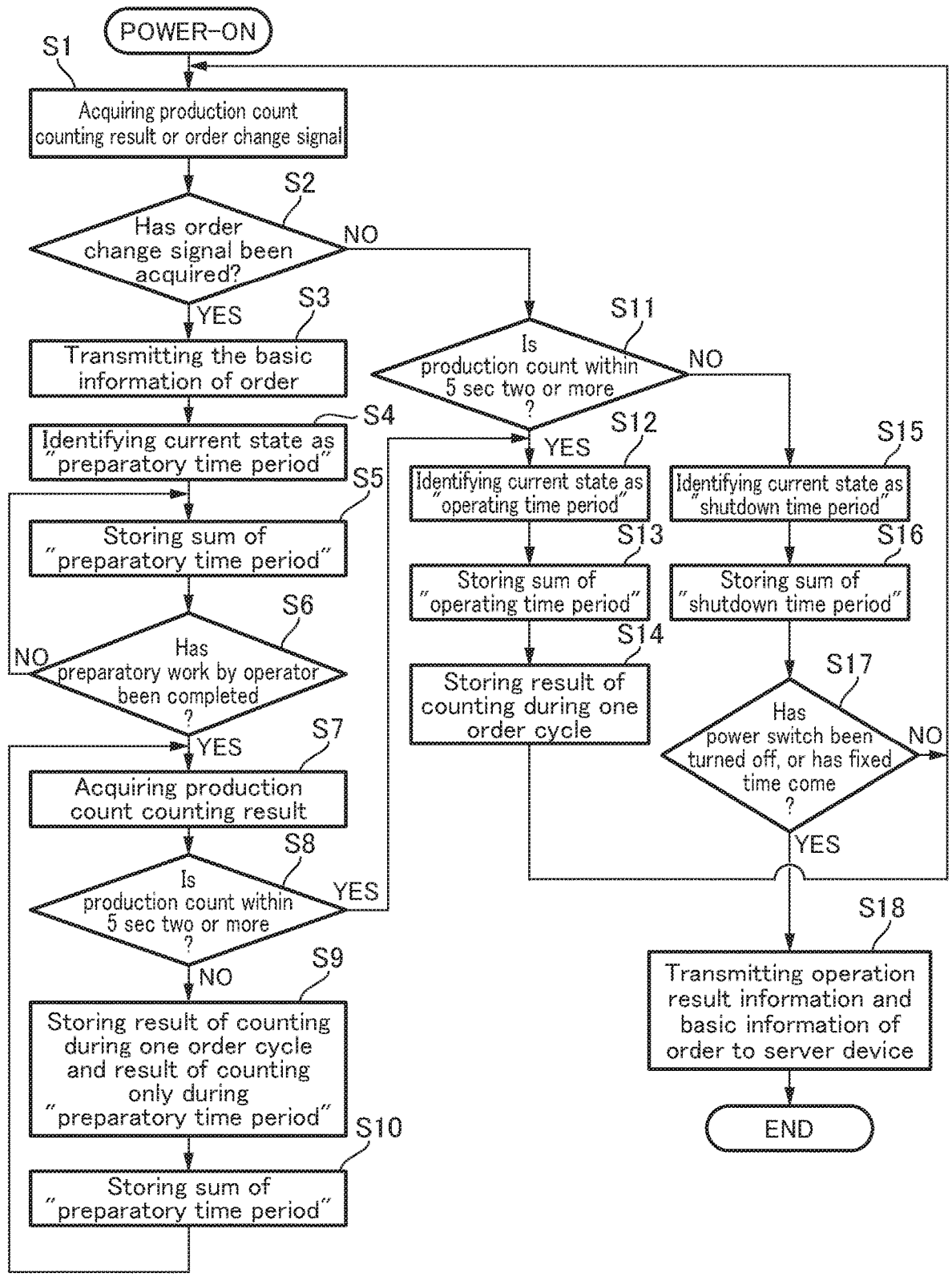
FIG. 15 is a flowchart showing the content of control to be executed by an upper-level management device during production of corrugated paperboard boxes in the operation result evaluation system according to the first embodiment.

Next, with reference to FIG. 15, the content of control of the upper-level management device 122 in the operation result evaluation system 100 according to the first embodiment will be described. FIG. 15 is a flowchart showing the content of control to be executed by the upper-level management device during production of corrugated paperboard boxes in the operation result evaluation system according to the first embodiment. In FIG. 15, S means "step".

As shown in FIG. 15, upon turning on the power of the upper-level management device 122 during start-up in a day, in S1, the signal acquisition part 142 operates to acquire the order change signal or a result of counting of the production count in one order cycle, from the lower-level management device 120. Then, when the order change signal is determined, in S2, to have been acquired, the control process proceeds to S3. In the S3, the production management part 150 operates to send the basic information of the next order to the lower-level management device 120, and change an order whose achieved information is to be stored in the storage part 152, to a current order. For example, initially, the basic information of a first order in the day is sent, and the achieved information of the first order is stored in the storage part 152.

Subsequently, in S4, based on receiving the order change signal, the state identification part 144 operates to identify that the operation of the box making machine 1 is in the preparatory time period (preparatory state). Then, in S5, the state identification part 144 operates to sum the preparatory time period, and store the resulting sum in the storage part 152. In the S5, the summing of the preparatory time period is repeatedly performed until the aforementioned preparatory work by the operator, such as replacement of the printing plate, is determined to have been completed, in S6 which is the next processing step. The summing of the preparatory time period is summing in the aforementioned first and second preparatory sub-steps. The determination in the S6 as to whether or not the preparatory work has been completed is made by detecting a signal indicating that the operator manually turns on the main motor switch of the box making machine 1.

Then, when the operator manipulates the single-sheet feeding switch or the like to perform the trial processing in the aforementioned third preparatory sub-step, the signal acquisition part 142 operates, in S7, to acquire a result of product count during the trial processing, summed by the production count counting part 132 of the lower-level management device 120. Subsequently, processing in the S7, S9 and S10 will be repeated until the operation state in which two or more corrugated paperboard boxes are produced per 5 seconds is detected in S8.

In the S9, the acquired counting result is stored in the storage part 152. Specifically, the acquired counting result is stored in the storage part 152 in a state in which it is divided into a result of counting during the current order cycle (the S7 and after-mentioned S13), and a result of counting during the preparatory time period (the S7). By storing counting results separated in this manner, it becomes possible to adequately extract data necessary for information to be generated. For example, in a case where 1000 sheets are counted during one order cycle, and 10 sheets are counted during the preparatory step, this counting result is formed into data: "Production count: 1000 sheets during one order cycle (including 10 sheets during preparatory step (time period))", in the achieved information as shown in FIG. 7. Further, in this case, the production count during the operating step is 990 sheets, so that this is formed into data: "Production count (during operating time period): 990 sheets", in the analytical information and the comparative information as shown in FIGS. 8 and 9.

Subsequently, in the S10, the preparatory time period is summed and the resulting sum is stored in the storage part 152, in the same manner as that in the S5. The summing of the preparatory time period in the S10 is summing in the third preparatory sub-step, and, in the S8, the time period of the third preparatory sub-step is summed until the number of counts of sheets is determined to become two or more per 5 seconds. As one modification, the summing is continued until the operator turns on the sheet-feeding start switch of the box making machine 1.

Here, the criteria for the determination in the S8 are based on a first fact that the trial processing typically comprises feeding only one corrugated paperboard sheet and inspecting the resulting one corrugated paperboard box, and therefore "two sheets" is set as one condition in order to eliminate the preparatory time period for the trial processing, and a second fact that in continuous feeding which is the operating state, the sheet-feeding speed "2 sheets/5 seconds" is basically set as a minimum value (lowest speed) of the operating speed.

When the number of counts of sheets is determined, in the S8, to be two or more per 5 seconds, the control process proceeds to S12. In the S12, the state identification part 144 operates to determine that the operating time period (operating state) of the box making machine 1 is started from the time point of counting of the first sheet in a counting cycle in which the number of counts of sheet is determined to become two or more per 5 seconds. Then, in S13, the operating time period is summed, and the resulting sum is stored in the storage part 152. Then, after the production count counting result acquired in the S7 by the signal acquisition part 142 is stored, in S14, in the storage part 152 as a result of counting of the production count during one order cycle, the control process returns to the S1. When the box making machine is in the operating state under the continuous sheet feeding, no order change signal is received. Thus, in this state, the steps S1, S2 and S11 to S14 will be repeated. Here, when the S14 is executed for the second time, the result of counting of the production count during one order cycle acquired in the S1 is stored in the storage part 152.

On the other hand, when the continuous sheet feeding is stopped after a last one of the corrugated paperboard sheets for the current order is fed, a new order change signal is sent from the lower-level management device 120 so as to execute the next order (S2: YES). Thus, the steps S4 to S10 will be executed again.

Subsequently, when the production count counting result is acquired, in the S1, without requiring the order change signal, the current state is determined, in the S2, not to be in the preparatory step, and the control process proceeds to the S11. In the S11, it is determined whether or not the number of counts of sheets is two or more per 5 seconds, in the same manner as that in the S8.

When the number of counts of sheets is determined to be two or more per 5 seconds, the control process proceeds to the S12. In the S12, the state identification part 144 operates to identify that the operation of the box making machine 1 is in the operating time period (operating state). Then, in S13, the operating time period is summed, and the resulting sum is stored in the storage part 152. Then, in the S14, the production count counting result during one order cycle, acquired in the S1 by the signal acquisition part 142, is stored in the storage part 152.

On the other hand, when the number of counts of sheets is determined, in the S11, not to be two or more per 5 seconds, the control process proceeds to S15. In the S15, the state identification part 144 operates to identify that the operation of the box making machine 1 is in the shutdown time period (shutdown state). In the S15, the state identification part 144 operates to determine that the shutdown time period (shutdown state) of the box making machine 1 is started from the time point of counting of the last sheet in a counting cycle in which the number of counts of sheets is determined not to be two or more per 5 seconds. Then, in S16, the shutdown time period is summed, and the resulting sum is stored in the storage part 152.

Subsequently, the processings of the S1, the S15 and the S16 will be repeated until the production in the day is determined, in S17, to be completed, e.g., based on detecting that the power switch of the upper-level management device 122 is turned off, or until the current state is determined, in the S1l, to be the operating state. When it is detected, the S17, that the power switch is turned off, or that a fixed time has come, the control process proceeds to S18. In the S18, the information transmission control part 148 operates to read out the operation result information for a given number of order after completion of production (e.g., previous 5000 orders), or the operation result information in the day, from the storage part 152, and send the read-out information to the server device 112 together with the basic information.

There is a case where, after producing corrugated paperboard boxes for the last order in the day, and performing order change to an order for positioning processing tools at cleaning positions, the power switch of the upper-level management device is turned off without feeding any corrugated paperboard sheet. Considering such a case, it is preferable to perform determination as to whether or not the power switch is turned off in the same manner as that in the S17, for example, between the S5 and the S6. In this case, the operation result information for a given number of order after completion of production or the operation result information in the day is sent to the server device 112 together with the basic information, in the same manner as that in the S18.

Figure 16:
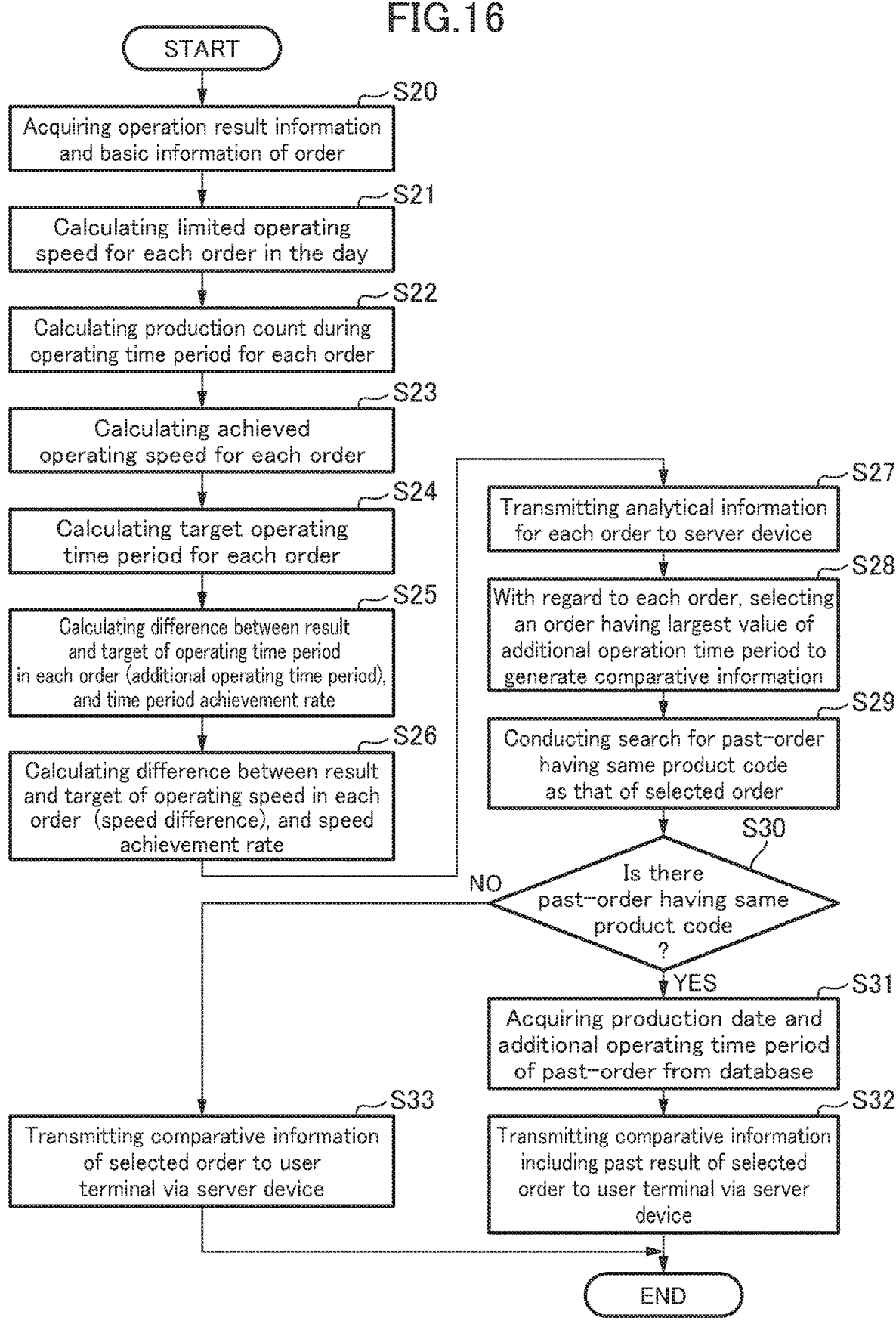
FIG. 16 is a flowchart showing the content of control to be executed by an analyzing device after completion of production of corrugated paperboard boxes in the operation result evaluation system according to the first embodiment.
Figure 17:
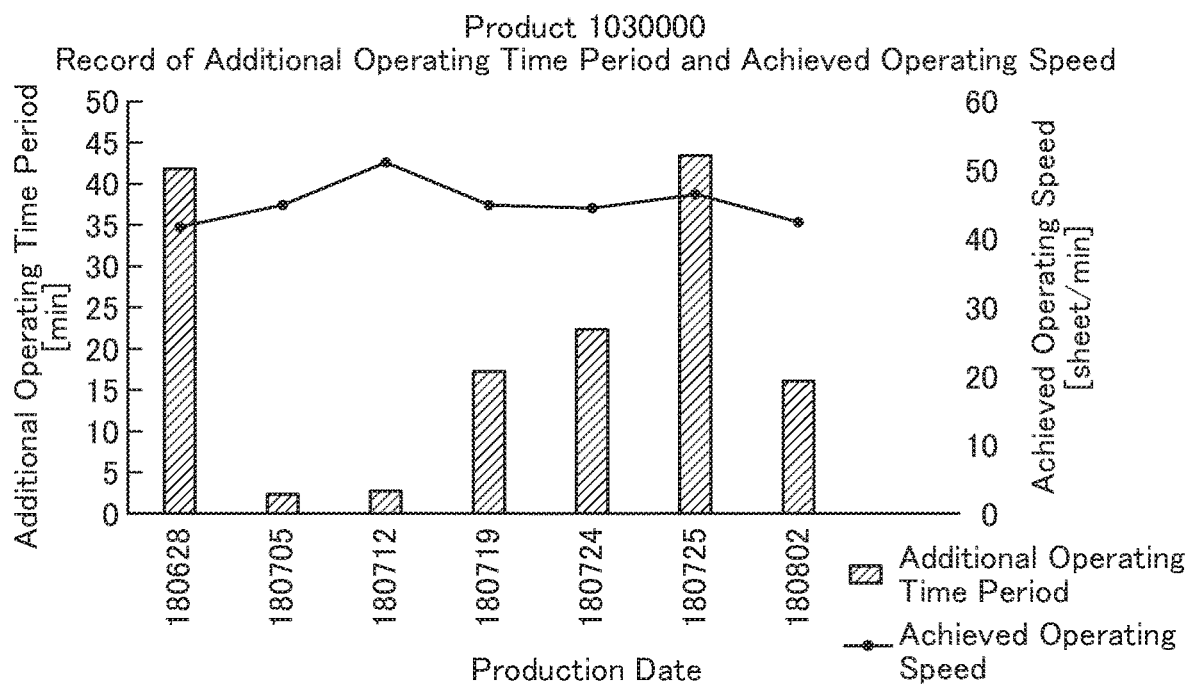
FIG. 17 is a diagram showing one example of comparative information generated and displayed in a user terminal by the operation result evaluation system according to the first embodiment.

Next, with reference to FIGS. 16 and 17, the content of control of the analyzing device 114 in the operation result evaluation system according to the first embodiment will be described. FIG. 16 is a flowchart showing the content of control to be executed by the analyzing device after completion of production of corrugated paperboard boxes in the operation result evaluation system according to the first embodiment, and FIG. 17 is a diagram showing one example of comparative information generated and displayed in the user terminal by the operation result evaluation system according to the first embodiment. In FIG. 16, S means "step".

As shown in FIG. 16, first of all, in S20, the operation result information acquisition part 162 operates to acquire, from the server device 112, the basic information (FIG. 6) and the operation result information (FIG. 7) for previous 5000 orders after completion of production, stored in the database 182 of the server device.

Subsequently, in S21, the limited operating speed calculation part 164 operates to, with respect to each order designating the day as the production date included in the operation result information, cross-check the combination of the sheet conveyance directional (FD) dimension and the binding number included in the basic information, against the matrix table (see FIG. 11) preliminarily stored in the storage part 178, to calculate the limited operating speed in each order. For example, with regard to an order having the basic information in which the sheet conveyance directional dimension is 320 mm, and the binding number is 20 sheets, as shown in FIG. 6, referring to the matrix table as shown in FIG. 11, the column "0" (0 to 399 mm) including 320 mm is selected, and the row "16" (16 to 20 sheets) including 20 sheets is selected, to determine the intersection 250 (sheets/min) of the column and the row, as the limited operation speed.

Subsequently, in S22, the achieved production count calculation part 166 operates to, with respect to each order designating the day as the production date, calculate, based on the acquired operation result information, the production count during the operating time period by subtracting the result of counting during the preparatory time period from the result of counting during one order cycle. For example, in the operation result information as shown in FIG. 7, the production count during the operating time period is calculated as 990 sheets by subtracting 10 sheets as the production count during the preparatory time period from 1000 sheets as the production count during the one order cycle. The calculated production count 990 sheets is incorporated in the analytical information as shown in FIG. 8.

Subsequently, in S23, the achieved operating speed calculation part 168 operates to, with respect to each order designating the day as the production date, calculate the achieved operating speed by dividing the production count during the operating time period, calculated in the S22, by the achieved operating time period included in the acquired operation result information. For example, in the operation result information as shown in FIG. 7, the achieved operating speed is calculate as 228 sheets/min (3.80 sheets/sec) by dividing 990 sheets as the production count calculated in the S22 by 260 seconds as the achieved operating time period.

Subsequently, in S24, the target operating time period calculation part 170 operates to, with respect to each order designating the day as the production date, calculating the target operating time period by dividing the achieved production count during the operating time period, calculated in the S22 by the limited operating speed calculated in the S21. For example, the target operating time period is calculated as 238 seconds (see FIGS. 7 and 8) by dividing 990 sheets as the production count calculated in the S22 by 250 sheets/min as the limited operating speed calculated in the S21 (see FIGS. 7 and 8).

Subsequently, in S25, the analytical information regarding the operating time period is generated with respect to each order designating the day as the production date. More specifically, the target and result comparison part/analytical information generation part 172 operates to calculate the additional operating time by subtracting the target operating time period calculated in the S24 from the achieved operating time period included in the acquired operation result information, and calculate the time period achievement rate by dividing the target operating time period calculated in the S24 by the achieved operating time period included in the operation result information, thereby generating the analytical information as shown in FIG. 8. For example, the additional operating time period is calculated as 22 seconds by subtracting 238 seconds as the target operating time period from 260 second as the achieved operating time period, and the time period achievement rate is calculated as 92% by dividing 238 seconds as the target operating time period by 260 seconds as the achieved operating time period (see FIGS. 7 and 8).

Subsequently, in S26, the analytical information regarding the operating speed is generated with respect to each order designating the day as the production date. More specifically, the target and result comparison part/analytical information generation part 172 operates to calculate the speed difference by subtracting the achieved operating speed calculated in the S23 from the limited operating speed calculated in the S21, and calculate the speed achievement rate by dividing the achieved operating speed calculated in the S23 by the limited operating speed calculated in the S21, thereby generating the analytical information as shown in FIG. 8.

In this embodiment, the target and result comparison part/analytical information generation part 172 is configured to perform both the comparison between a result and a target of the operating time period and the comparison between a result and a target of the operating speed. Alternatively, for example, it may be configured to perform only the comparison between a result and a target of the operating time period.

Further, in this embodiment, the target and result comparison part/analytical information generation part 172 is configured to calculate all the additional operating time period, the time period achievement rate, the operating speed difference, and the speed achievement rate. Alternatively, for example, it may be configured to calculate only the additional operating time period.

Further, as the comparative information, information about only the achieved operating speed may be generated as shown in FIG. 10. Specifically, a value itself of the achieved operating speed in a current-order and a value itself of the achieved operating speed in a past-order may be generated as the comparative information, and information such as these values of the achieved operating speed in the current- and past-orders or a difference between these values may be displayed on the user terminal 190.

Subsequently, in S27, the analytical and comparative information transmission control part 176 operates to, with respect to each order designating the day as the production date, send, to the server device 112, the analytical information (see FIG. 8) including the additional operating time period and the speed difference, generated in the S25 and S26. As one modification, the analytical information may be stored in the storage part (database) of the analyzing device 114 in association with the operation result information and the basic information, without sending the analytical information to the server device 112.

Subsequently, in S28, the order selection part 173 operates to select an order for which the comparative information is to be provided to the user, based on values of the additional operating time period for all orders designating the day as the production date, detected in the S25, and generate the comparative information (FIG. 9) for the selected order. In this embodiment, an order having the largest value of the additional operating time period is selected.

Subsequently, in S29, the past-order identification part/past information acquisition part 174 operates to make search for a past-data including the same product code as that of the order selected in the S28, in the database 182. Target data of the search is the aforementioned record database as shown in FIG. 14.

Then, the control process proceeds to S30. In the S30, the past-order identification part/past information acquisition part 174 operates to determine whether or not there is a past-data including the same product code as the selected code in the database 182. When, in the S30, the presence of such a past-order is determined, i.e., the past-data including the same product code as the selected code is identified, the control process proceeds to S31. In the S31, the past-order identification part/past information acquisition part 174 operates to acquire the production date and the analytical information of the identified past-data from the record database (database 182) as shown FIG. 14.

Then, the control process proceeds to S32. In the S32, the analytical and comparative information transmission control part 176 operates to cause the comparative information including current and past operation results of the order selected in the S28, as shown in FIG. 10, to be transmitted to the user terminal 190 via the server device 112.

On the other hand, when, in the S30, the absence of the concerned past-order is determined, the control process proceeds to S33. In the S33, the analytical and comparative information transmission control part 176 operates to cause the comparative information of only the current order selected in the S28 to be transmitted to the user terminal 190 via the server device 112.

Here, one example of a screen image displayed on the user terminal 190 based on the comparative example transmitted to the user terminal 190 is shown in FIG. 17. That is, the comparative information regarding records of the additional operating time period and the achieved operating speed in past-orders having the same corrugated paperboard box specifications as those of the order selected in the S28, which has the largest value of the additional operating time period is provided to and displayed on the user terminal 190, as shown in FIG. 17. Here, the additional operating time period becomes longer in proportion to the production count. Thus, in the example shown in FIG. 17, the additional operating time period can serve as a guide for the user to recognize how much a total time period leading to loss occurred at the present and in the past. Further, based on the achieved operating speed, the user can recognize how much the achieved operating speed at the present changed (lowered) with respect to that in the past.

On the other hand, a value of the additional operating time period per unit product count, e.g., 10 sheets, may be displayed, or the time period achievement rate, the operating speed difference and/or the speed achievement rate may be displayed as a comparative value between a target and a result. In this case, the user can review whether the operating time period in a repeat order could be shortened to suppress production cost. Further, the order selection part 173 operates to select a given order in the above manner, so that the amount of information to be displayed on the user terminal can be reduced, as compared with a case where information regarding all orders subjected to production in a day is provided, and thereby it becomes easier for the user to understand and utilize the information.

Further, in this embodiment, the record of the analytical information is displayed the as the comparative information on the user terminal 190, so that the user can review whether or not the operating time period could be shortened to suppress production cost. Further, the additional operating time period increased, or the achieved operating speed lowered, as compared with a past-order having the same corrugated paperboard specifications, such comparative information can motivates the user to conduct machine maintenance so as to improve the operating speed.

It is to be understood that the comparative information may be transmitted to a user compute (not shown) for sending a production management plan to the upper-level management device 122, instead of the user terminal 190. Further, the comparative information may be transmitted to the upper-level management device 122 and the lower-level management device 120 so as to be displayed on the displays of the control panels 154, 126.

Next, a modification of the comparative information to be generated by the order selection part 173 and transmitted by the analytical and comparative information transmission control part 176 will be described.

The order selection part 173 may be configured to select a plurality of orders in descending order of the additional operating time period, and generate a plurality of pieces of the comparative information for the selected orders. Alternatively, the order selection part 173 may be configured to select an order having the smallest value of the additional operating time period, and generate the comparative information for the selected order, thereby informing the user about the fact that maintenance of the box making machine 1 by the user is good. Alternatively, the order selection part 173 may be configured to select an order having the largest value of the production count during the operating time period.

Further, as a modification, the order selection part 173 may be configured to select the entirety of a plurality of orders designating the same day as the production date or a part of the orders whose number may be arbitrarily settable. For example, the order selection part 173 may be configured to select two or more orders in which the additional operating time period is greater than a given value.

As another modification, the order selection part 173 may be configured to, with respect to each of all orders of the same production date (each order in a day), compare each of the additional operating time period, the time period achievement rate, the achieved operating speed, the operating speed difference and/or the speed achievement rate with a corresponding one of the past additional operating time period, the past time period achievement rate, the past achieved operating speed, the past operating speed difference and/or the past speed achievement rate acquired by the past-order identification part/past information acquisition part 174, and select an order having the largest difference in terms of the additional operating time period, the time period achievement rate, the achieved operating speed, the operating speed difference and/or the speed achievement rate. In this case, the past-order identification part/past information acquisition part 174 may be configured to, with respect to each of all orders of the same production date (each order in a day), identify a past-order having the same corrugated paperboard box specifications as those of the order, and acquire the past additional operating time period, the past time period achievement rate, the past achieved operating speed, the past operating speed difference and/or the past speed achievement rate in the identified past-order, and the past production date thereof.

Alternatively, the comparative information generation part 175 may be configured to generate comparative information regarding the sum of the operating time period and the shutdown time period, and provide the generated comparative information to the user, together with past information including past comparative information regarding the above sum. This allows the user to objectively recognize a relationship between the target operating time period and the achieved operating time period, including a time period during which the machine is shut down due to failure or the like. In this case, the target and result comparison part/analytical information generation part 172 is configured to calculate the sum of the achieved operation time period and the achieved shutdown time period included in the operation result information, calculate the sum of a target shutdown time period and the target operating time period calculated by the target operating time period calculation part 170; and calculate a difference and a ratio therebetween. Here, although an ideal value of the target shutdown time period is 0 second, it is preferably set to an arbitrary value appropriate to the state of the box making machine 1.

Alternatively, the comparative information generation part 175 may be configured to generate comparative information regarding the sum of the operating time period, the shutdown time period and the preparatory time period, and provide the generated comparative information to the user, together with past information including past comparative information regarding the above sum. This allow user to review whether or not the production time period could be shortened in the entire order to suppress production cost. In this case, the target and result comparison part/analytical information generation part 172 is configured to calculate the sum of the achieved operation time period, the achieved shutdown time period and the achieved preparatory time period included in the operation result information; calculate the sum of the target operating time period calculated by the target operating time period calculation part 170, the target shutdown time period and a target preparatory time period; and calculate a difference and a ratio between ones of them. With regard to the target preparatory time period, a target preparatory time period calculation part is preferably added to the analyzing device 114, wherein a time period required for an experienced and skilled operator to perform order change work (replacement, trial processing, inspection, adjustment, etc.) is preliminarily measured to form a map.

Figure 18:
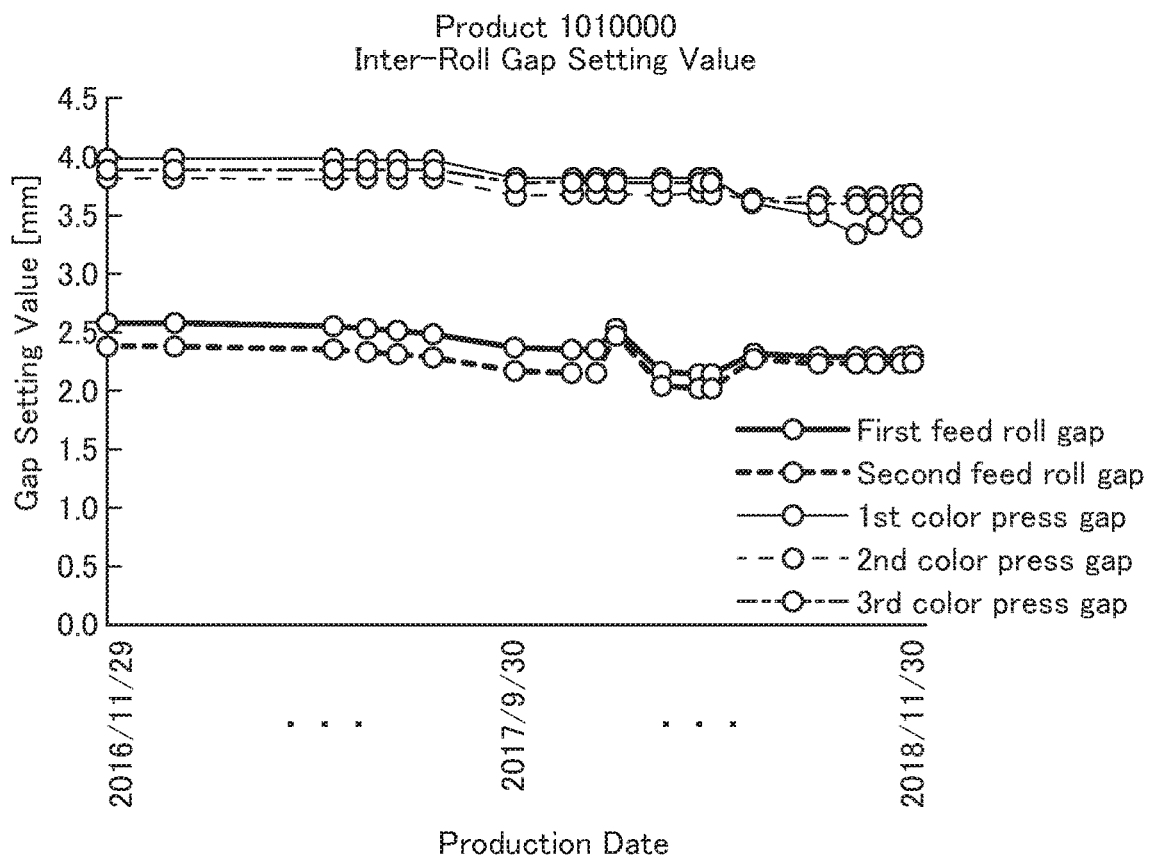
FIG. 18 shows one example of a presentation form of record information about the position of a machine component of a box making machine to be generated by a modification of the operation result evaluation system according to the first embodiment and displayed on a used terminal together with comparative information.

Next, with reference to FIG. 18, another modification of the comparative information to be generated by the comparative information generation part 175 and transmitted by the analytical and comparative information transmission control part 176 will be described. FIG. 18 shows one example of a presentation form of record information about the position of a machine component of the box making machine to be generated by the modification of the operation result evaluation system according to the first embodiment and displayed on the used terminal together with comparative information.

Figure 19:
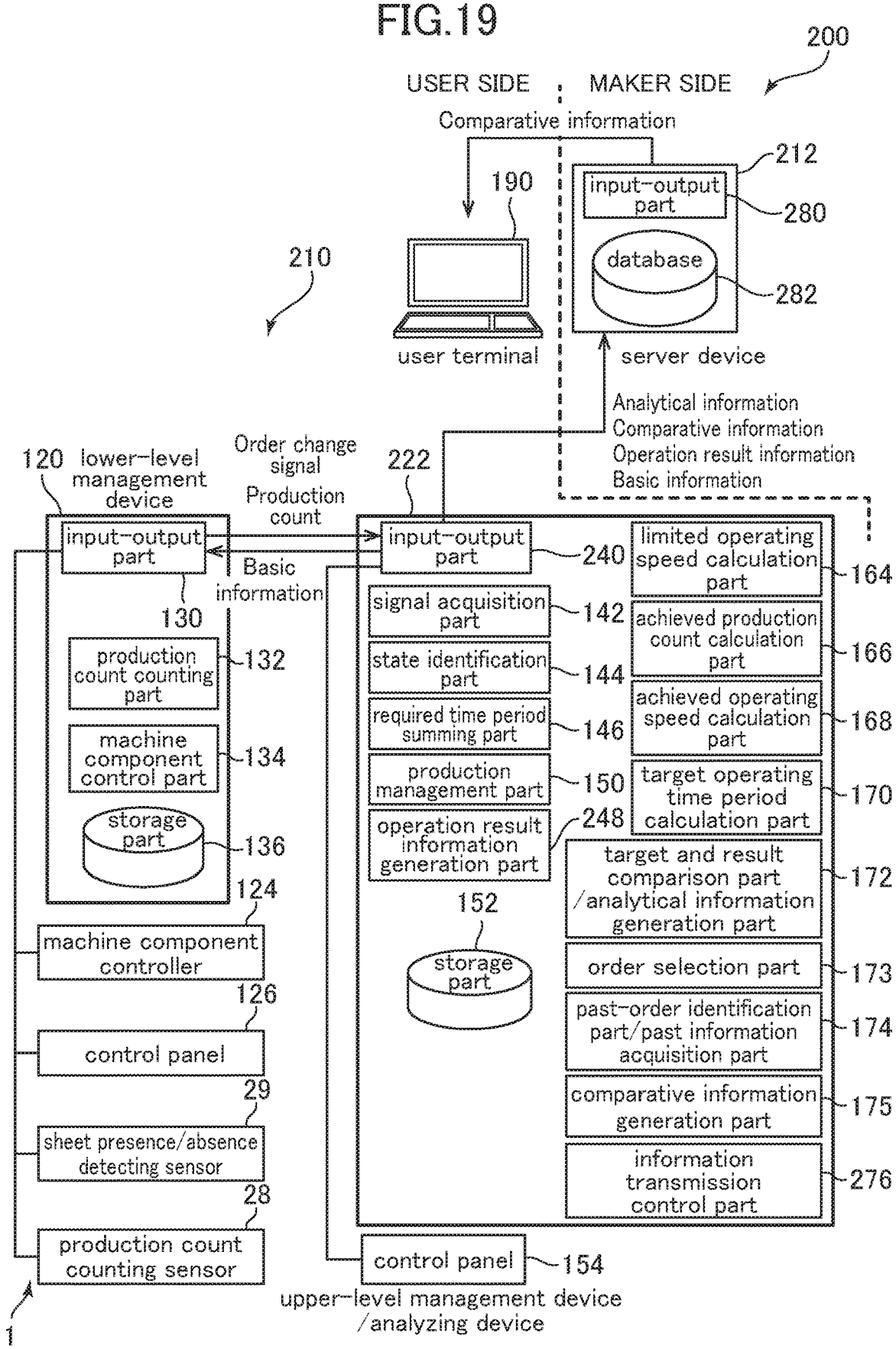
FIG. 19 is a block diagram showing a schematic configuration of an operation result evaluation system for a corrugated paperboard box making machine, according to a second embodiment of the present invention.

First of all, the analytical and comparative information transmission control part 176 may be configured to send current position information and past position information of a member of each machine component of the box making machine to the user terminal, together with the comparative information. One example of the presentation form displayed on the user terminal 190 is shown in FIG. 19. As shown in FIG. 19, record information about an inter-roll gap setting value may be displayed. In this case, for example, when a current member position of is deviated from a past member position, there is a possibility that the machine component is worn out. Thus, by additionally providing such past position information to the user, the user can inspect the machine component with a focus on a portion suspicious for wear-out to efficiently perform machine maintenance.

Alternatively, the analytical and comparative information transmission control part 176 may be configured to send, to the user terminal 190, actual position information and maker-recommended position information of members of each of the machine components 2 to 6 and 8 of the box making machine 1, together with the comparative example. Specifically, when the actual position information of the members largely deviates from maker-recommended position information, the machine component is likely to be worn out. Thus, based on the provided position information, the user can inspect the machine component with a focus on a portion suspicious for wear-out to efficiently perform machine maintenance.

Here, as mentioned above, in the event of an order change, the user conducts trial processing and inspects the resulting corrugated paperboard box. Then, when the inspected box is determined to be defective, the operator adjusts the position of a member associated with a defective part of the box. For example, when a printing position is deviated due to delay in sheet conveyance, the operator conducts adjustment, e.g., to narrow the gap between the upper and lower feed rolls so as to increase a grip force for a corrugated paperboard sheet. For example, in a case where the rubber portions of the upper and lower feed rolls are worn away, the operator conducts adjustment to further narrow the gap between the upper and lower feed rolls so as to compensate for lowering of the grip force due to wear. When the user recognizes that a current value of the gap between the upper and lower feed rolls largely deviates from a past value of the gap between the upper and lower feed rolls, he/she can focus on inspection of the feed rolls. Further, when the user recognizes that a current value of the gap between the upper and lower feed rolls largely deviates from a maker-recommended gap value, he/she can focus on inspection of the feed rolls.

As another modification, the analytical and comparative information transmission control part 176 may be configured to send, to the user terminals 190, state information of a (fed) corrugated paperboard sheet used in a current production, and state information of a corrugated paperboard sheet used in a past production. Examples of the state information of the sheet include the temperature, the amount of water, and the degree of warpage of the sheet. The operator measures state quantities of the sheet before production, and inputs the measured state quantities through the use of the control panel 126, 154 of the upper-level management device 122. Alternatively, a sensor may be installed in the sheet feeder 2 to automatically measure and acquire the state quantities of the sheet before production. The state information of the sheet is sent from the upper-level management device 122 to the analyzing device 114 via the server device 112, together with the operation result information.

Next, a modification of the matrix table for use in calculating the limited operating speed by the limited operating speed calculation part 164 will be described.

In the above first embodiment, the matrix table defines the limited operating speed in accordance with the combination of the sheet conveyance directional dimension and the binding number. However, in addition to such a matrix table, other matrix tables may be prepared, e.g., with respect to each product model of counter-ejector. Further, other matrix tables may be prepared with respect to each shape type of corrugated paperboard box (A, B, etc.). Further, other matrix tables may be prepared with respect to each type of raw paperboard material (liner and corrugated medium) constituting a corrugated paperboard sheet. When using such a matric table, information about the type of raw paperboard material is preferably incorporated in the basic information (order information). Further, other matrix tables may be prepared with respect to each degree of warpage of the sheet S. In this case, considering that the conveyance displacement of the sheet is more likely to occur as the degree of warpage of the sheet becomes larger, the matrix table is formed such that the limited operating speed is set to a relatively low value so as to allow the sheet to be conveyed while being reliably gripped. Here, with regard to the degree of warpage, the operator visually evaluates the state of the sheet and inputs an evaluated level of warpage through the use of the control panel of the lower-level management device 120 or the upper-level management device 122. The input warpage information is sent to the analyzing device 114 via the server device 112, together the operation result information.

Next, main functions/advantageous effects of the operation result evaluation system according to the first embodiment will be described.

In the first embodiment, the operation result evaluation system 100 for use in the corrugated paperboard box making machine 1 comprises: the production management device 110 for production management of the box making machine; the analyzing device (operation result evaluation device) 114 for, after completion of production of corrugated paperboard boxes for a given order (after completion of production in a day), evaluating the operation result of the box making machine 1, with regard to a given number of orders (previous 5000 orders or orders in the day); and the storage device (182) for storing therein a given database, wherein the production management device 110 is configured to, with respect to each order, generate the operation result information including the production count and the achieved operating time period, as shown in FIG. 7, and the analyzing device 114 is configured to: with respect to each order, calculate the achieved production count which is a number of corrugated paperboard boxes produced by the box making machine during the achieved operating time period (reference sign 166 in FIG. 5, S22 in FIG. 16); with respect to each order, calculate the limited operating speed of the box making machine (reference sign 164, S21); with respect to each order, calculate the target operating time period (reference sign 170, S24); with respect to each order, calculate the additional operating time period which is a difference between the target operating time period and the achieved operating time period, and/or the time period achievement rate obtained by dividing the target operating time period by the achieved operating time period (reference sign 174, S25); with respect to each order, associate the calculated additional operating time period and/or the calculated time period achievement rate with the achieved production count to generate the analytical information regarding the operating time period in each order, as shown in FIG. 8, wherein the database (182) includes the analytical information regarding the operating time period for each order, the production date in the operation result information and the order information for each order, and wherein the operation result evaluation device is further configured to refer to the order information of past production dates in the database to, with respect to each of the entirety or part of the given number of orders, identify a past-order of a past production date having the same corrugated paperboard box specifications as those in the order information of any one of the entirety or part of the given number of orders (reference sign 174, S29); acquire the analytical information regarding a past operating time period for the identified past-order, in the database (FIG. 14), and the production date in the operation result information associated with the acquired analytical information (reference sign 174, S32); with respect to each of the entirety or part of the given number of orders, associate the generated analytical information regarding the operating time period and the production date thereof, the acquired analytical information regarding the past operating time period and the past production date thereof, and the order information common in them, with each other, thereby generating comparative information; and cause the generated comparative information to be transmitted to the user terminal 190, so that it is possible to provide, to a user, quantitative information regarding a loss dependent on current and past values of the operating time period (e.g., information as show in FIG. 9, the additional operating time period as shown in FIG. 17, or information about the achieved operating speed displayed in place of or in addition to the time period achievement rate) in each order after completion of production, so as to allow the user to figure out the efficiency in production of corrugated paperboard boxes. Further, by providing, to the user, quantitative information regarding a loss dependent on current and past values of the operating time period in each order, it is possible to allow the user to take notice of a sign of degradation of a machine component and recognize the necessity of inspection.

From another aspect, in the first embodiment, the operation result evaluation system 100 for use in the corrugated paperboard box making machine 1 comprises: the production management device 110 for production management of the box making machine; the analyzing device (operation result evaluation device) 114 for, after completion of production of corrugated paperboard boxes for a given order (after completion of production in a day), evaluating the operation result of the box making machine 1, with regard to a given number of orders (previous 5000 orders or orders in the day); and the storage device (182) for storing therein a given database, wherein the production management device 110 is configured to, with respect to each order, generate the operation result information including the production count and the achieved operating time period, as shown in FIG. 7, and the analyzing device 114 is configured to: with respect to each order, calculate the achieved production count which is a number of corrugated paperboard boxes produced by the box making machine during the achieved operating time period (reference sign 166 in FIG. 5, S22 in FIG. 16); with respect to each order, calculate the limited operating speed of the box making machine (reference sign 164, S21), and set the limited operating speed as the target operating speed (reference sign 164, S21); with respect to each order, calculate the achieved operating speed of the box making machine (reference sign 168, S23); with respect to each order, calculate the operating speed difference which is a difference between the target operating speed and the achieved operating speed, and/or the speed achievement rate obtained by dividing the achieved operating speed by the target operating speed (reference sign 172, S26); with respect to each order, associate the operating speed difference and/or the speed achievement rate with the achieved production count to generate the analytical information regarding the operating speed in each order, as shown in FIG. 8; wherein the database (182) includes the analytical information regarding the operating speed in each order, and the production date in the operation result information and the order information in each order, as shown in FIG. 14, and wherein the operation result evaluation device is further configured to refer to the order information of past production dates in the database to, with respect to each of an entirety or part of the given number of orders (e.g., an order having the largest value of the operating speed difference), identify a past-order of a past production data having the same corrugated paperboard box specifications as those in the order information of any one of the entirety or part of the given number of orders (reference sign 174, S29); acquire the analytical information regarding a past operating speed for the identified past-order, in the database (FIG. 14), and the production date in the operation result information associated with the acquired analytical information (reference sign 174, S32); associate the generated analytical information regarding the operating speed and the production date thereof, the acquired analytical information regarding the past operating speed the past production date thereof, and the order information common in them, with each other, thereby generating the comparative information as shown in FIG. 9; and cause the generated comparative information to be transmitted to the user terminal 190, so that it is possible to provide, to the user, quantitative information regarding a loss dependent on current and past values of the operating speed (e.g., information as shown in FIG. 10, the achieved operating speed as shown in FIG. 17, or information about the additional time period displayed in replace of or in addition to the speed achievement rate, in FIG. 17) in each order after completion of production, so as to allow the user to figure out the efficiency in production of corrugated paperboard boxes. Further, by providing, to the user, quantitative information regarding a loss dependent on current and past values of the operating speed in each order, it is possible to allow the user to take notice of a sign of degradation of a machine component and recognize the necessity of inspection.

Further, in the first embodiment, the production management device 110 of the operation result evaluation system 100 is provided on the side of a producer (user) who produces corrugated paperboard boxes using the box making machine 1, and the analyzing device (operation result evaluation device) 114 and the database (storage part) 182 is provided on the side of a manufacturer (maker) of the box making machine, so that the comparative information (FIG. 9) is transmitted to the user of the box making machine 1 (producer of corrugated paperboard boxes) and displayed on the user terminal 190 as shown in FIG. 17 to allow the user to figure out the efficiency in production of corrugated paperboard boxes, and wear or the like of a machine component of the box making machine. Further, the manufacturer of the box making machine (maker) can utilize information obtained from the operation result evaluation device 114 or the database 182, for, e.g., improvement, design change or the like of the box making machine produced by the manufacturer itself. Further, in a situation where the efficiency in production of corrugated paperboard boxes is deteriorated and there arises a concern about wear or the like of a machine component of the box making machine, the manufacturer of the box making machine (machine maker) can provide appropriate support, such as giving advice about inspection and maintenance of the box making machine, to the producer (machine user).

Next, with reference to FIG. 19, a schematic configuration of an operation result evaluation system for use in a corrugated paperboard box making machine, according to a second embodiment of the present invention, will be described. FIG. 19 is a block diagram showing the schematic configuration of the operation result evaluation system according to the second embodiment.

The operation result evaluation system 200 according to the second embodiment is different from the first embodiment, mainly in that in the side of a user (on the side of a producer who produces corrugated paperboard boxes using the box making machine), the upper-level management device and the analyzing device are constructed as a single device as designated by the reference sign 222; and the basic information, the operation result information, the analytical information and the comparative information are sent from this the upper-level management device/analyzing device 222 to a server device 212 on the side of a maker (on the side of a manufacturer of the box making machine) and the database (storage part) 282, and the remaining basic configuration is identical to the first embodiment. Here, the operation result evaluation system 200 according to the second embodiment is identical to the first embodiment, in that comparative information generated in the upper-level management device/analyzing device 222 is transmitted to a user terminal via an input-output part 280 of the server device 212. The following description will be made about only differences from the first embodiment. Here, any element or component substantially identical to that in the first embodiment will be described using the same reference sign as that in the first embodiment.

Firstly, in the second embodiment, a production management device 210 comprises a lower-level management device 120 and the upper-level management device/analyzing device 222, wherein an input-output part 240 of the upper-level management device/analyzing device 222 has a function equal to those of the input-output parts 140, 160 in the first embodiment.

In the second embodiment, the upper-level management device/analyzing device 222 comprises an operation result information generation part 248, in place of the operation result information generation part/information transmission control part 148 and the operation result information acquisition part 162 in the first embodiment. This operation result information generation part 248 is operable to generate the operation result information in each order based on the production date, the result of counting of the production count, the achieved operating time period, the achieved shutdown time period, the achieved preparatory time period, etc., and store the generate operation result information in a storage part 152 in association with the basic information. Alternatively, with respect to each order, comprehensive information formed by associating the basic information, the operation result information, the analytical information and comparative information with each other with respect to each order may be stored in the storage part 152, as with the storage part 178 in the first embodiment.

In the second embodiment, the information transmission control part 276 is operable to transmit the basic information stored in the storage part 152, the operation result information, the analytical information and the comparative information generated in the upper-level management device/analyzing device 222, to the server device 212 via the input-output part 240, in association with each other with respect to each order, and cause the transmitted information to be stored in the database (storage device) 282. Alternatively, with respect to each order, the operation result information, the analytical information and comparative information may be stored in a storage part 152 in association with the basic information, as with the storage part 178 in the first embodiment.

In the second embodiment, the comparative information generated in the upper-level management device/analyzing device 222 may be transmitted to the user terminal 190 via the server device 312 and/or directly to the user terminal 190. Further, the comparative information generated in the upper-level management device/analyzing device 222 may be transmitted to the upper-level management device/analyzing device 222 and the lower-level management device 120 and displayed on displays of control panels 154, 126 thereof.

In the second embodiment configured as above, the upper-level management device/analyzing device (operation result evaluation device) 222 of the production management device 210 in the operation result evaluation system 200 is provided on the side of a user (on the side of a producer who produces corrugated paperboard boxes using the box making machine), and the database 282 of the operation result evaluation system 200 is provided on the side of a maker (on the side of a manufacturer of the box making machine), so that the production management device and the operation result evaluation device can be constructed as an integral device (222). In this case, it becomes easier for the producer of corrugated paperboard box (user) to handle the operation result evaluation system. On the other hand, the maker (manufacturer of the box making machine) can utilize information obtained from the database (storage part), for, e.g., improvement, design change or the like of the box making machine produced by the manufacturer itself. Further, in a situation where the efficiency in production of corrugated paperboard boxes is deteriorated and there arises a concern about wear or the like of a machine component of the box making machine, the manufacturer of the box making machine (maker) can provide appropriate support, such as giving advice about inspection and maintenance of the box making machine, to the producer (user).

Figure 20:
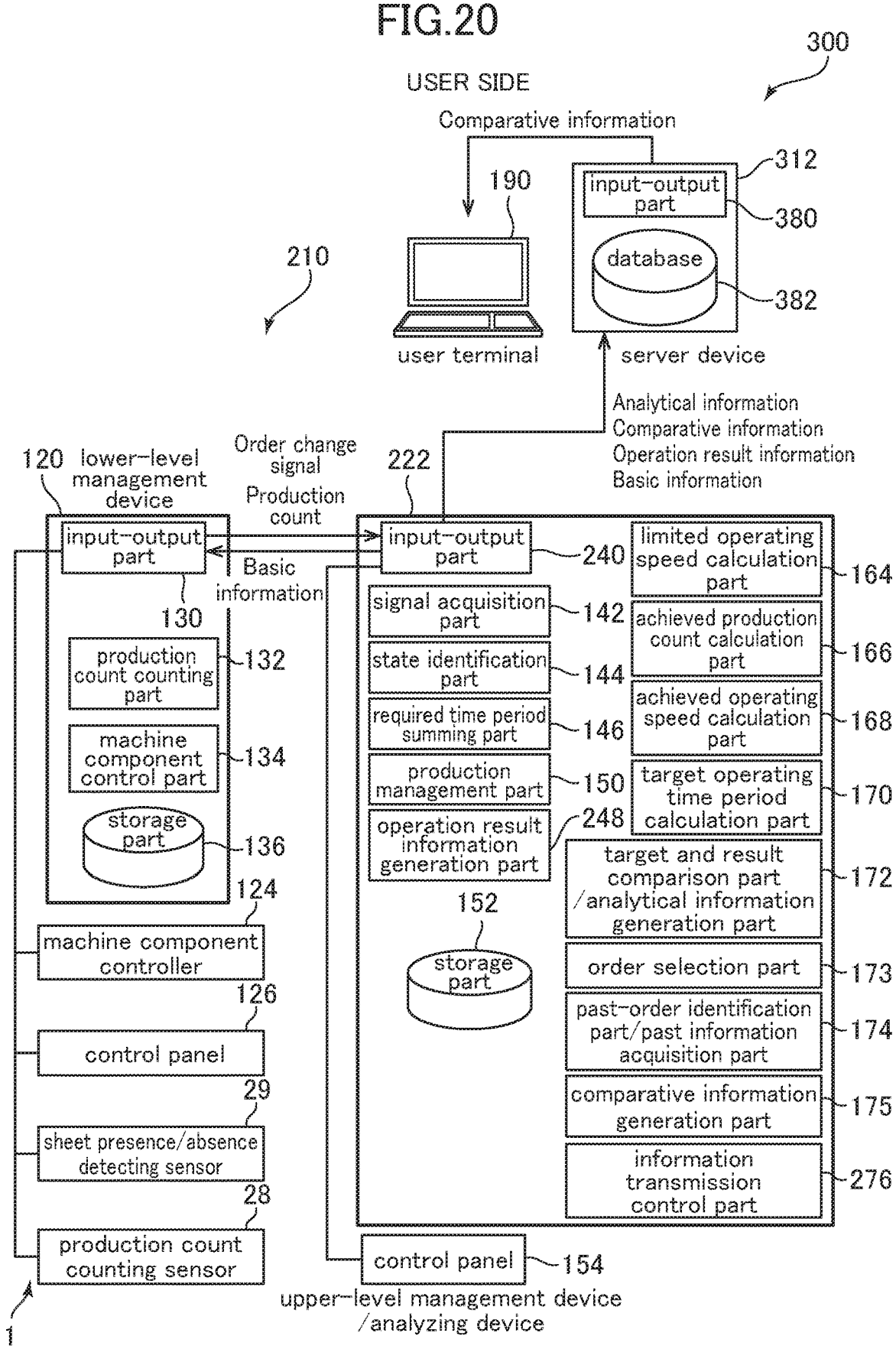
FIG. 20 is a block diagram showing a schematic configuration of an operation result evaluation system for a corrugated paperboard box making machine, according to a third embodiment of the present invention.

Next, with reference to FIG. 20, a schematic configuration of an operation result evaluation system for use in a corrugated paperboard box making machine, according to a third embodiment of the present invention, will be described. FIG. 20 is a block diagram showing the schematic configuration of the operation result evaluation system according to the third embodiment.

The operation result evaluation system 300 according to the third embodiment is different from the first embodiment, mainly in that a server device 313 is provided inside a company of a user; the upper-level management device and the analyzing device are constructed as a single upper-level management device/analyzing device 222 as with the second embodiment; and the basic information, the operation result information, the analytical information and the comparative information are sent from this the upper-level management device/analyzing device 222 to the server device 312 and the database (storage part) 382, and the remaining basic configuration is identical to the first embodiment. Here, the operation result evaluation system 300 according to the third embodiment is identical to the first embodiment, in that comparative information generated in the upper-level management device/analyzing device 222 is transmitted to a user terminal via an input-output part 380 of the server device 312. The following description will be made about only differences from the first and second embodiments. Here, any element or component substantially identical to that in the first or second embodiment will be described using the same reference sign as that in the first or second embodiment.

Firstly, in the third embodiment, a production management device 210 comprises a lower-level management device 120 and the upper-level management device/analyzing device 222, as with the second embodiment, wherein the upper-level management device/analyzing device 222 comprises an operation result information generation part 248, as with the second embodiment.

In the third embodiment, the information transmission control part 276 is operable to transmit the basic information stored in the storage part 152, the operation result information, the analytical information and the comparative information generated in the upper-level management device/analyzing device 222, to the server device 313 via an input-output part 240, in association with each other with respect to each order, and cause the transmitted information to be stored in the database 382 as comprehensive information, as with the second embodiment. Alternatively, with respect to each order, the operation result information, the analytical information and comparative information may be stored in the storage part 152 in association with the basic information, as with the storage part 178 in the first embodiment.

In the second embodiment, the comparative information may be transmitted directly to the user terminal 190 without passing through the server device 312. Further, the comparative information generated in the upper-level management device/analyzing device 222 may be transmitted to the upper-level management device/analyzing device 222 and the lower-level management device 120 and displayed on displays of control panels 154, 126 thereof.

In the third embodiment configured as above, the upper-level management device/analyzing device (operation result evaluation device) 222 of the production management device 210 and the database 382 in the operation result evaluation system 300 are provided on the side of a user (on the side of a producer who produces corrugated paperboard boxes using the box making machine), so that, for example, the production management device and the operation result evaluation device can be constructed as an integral device (222). In this case, it becomes easier for the producer of corrugated paperboard box (user) to handle the operation result evaluation system.

What is claimed is:

1. An operation result evaluation system for use in a corrugated paperboard box making machine to evaluate an operation result of the box making machine, based on order information which is information regarding an order for corrugated paperboard boxes, and operation result information which is information regarding the operation result of the box making machine, comprising:

a production management device for the box making machine, the production management device comprising
- a production count counting part configured to count a production count which is a number of corrugated paperboard boxes produced for each order by the box making machine,
- an achieved operating time period calculation part configured to calculate an achieved operating time period during which corrugated paperboard boxes have been produced for each order by the box making machine, and
- an operation result information generation part configured to, with respect to each order, generate operation result information including a production date of corrugated paperboard boxes, the production count and the achieved operating time period;

an operation result evaluation device configured to, after completion of production of corrugated paperboard boxes for a given order, evaluate the operation result of the box making machine, with regard to a given number of orders; and a storage device for storing therein a given database, wherein the operation result evaluation device comprises:
- an achieved production count calculation part configured to, with respect to each order, calculate, based on the generated operation result information, an achieved production count which is a number of corrugated paperboard boxes produced by the box making machine during the achieved operating time period;
- a limited operating speed calculation part configured to, with respect to each order, calculate, based on the order information, a limited operating speed of the box making machine to be limited depending on each order;
- a target operating time period calculation part configured to, with respect to each order, calculate a target operating time period, based on the calculated achieved production count and the calculated limited operating speed;
- a target and result comparison part configured to, with respect to each order, compare the calculated target operating time period with the achieved operating time period to calculate an additional operating time period which is a difference between the target operating time period and the achieved operating time period, and/or a time period achievement rate which is a quotient obtained by dividing the target operating time period by the achieved operating time period; and
- an analytical information generation part configured to generate analytical information regarding the operating time period in each order, based on the calculated additional operating time period and/or the calculated time period achievement rate, wherein the given database stored in the storage device includes the analytical information regarding the operating time period for each order, the production date in the operation result information and the order information for each order, associated with the analytical information regarding the operating time period, and wherein the operation result evaluation device further comprises:

a past-order identification part configured to refer to order information of past production dates in the database stored in the storage device to, with respect to each of an entirety or part of the given number of orders, identify a past-order of a past production date having the same corrugated paperboard box specifications as those in the order information of any one of the entirety or part of the given number of orders;

a past information acquisition part configured to acquire analytical information regarding a past operating time period for the identified past-order, in the database stored in the storage device, and a production date in the operation result information associated with the acquired analytical information;

a comparative information generation part configured to, with respect to each of the entirety or part of the given number of orders, associate the generated analytical information regarding the operating time period and the production date thereof, the acquired analytical information regarding the past operating time period and the past production date thereof, and the order information common in them, thereby generating comparative information; and an information transmission control part configured to cause the generated comparative information to be transmitted to a user terminal.

2. The operation result evaluation system as recited in claim 1, wherein:

the analytical information generation part of the operation result evaluation device is operable to, with respect to each of the orders of the same production date, generate the analytical information regarding the operation time period;

the operation result evaluation device further comprises a first order selection part configured to select an order having a largest value of the additional operating time period and/or a smallest value of the time period achievement rate, among values of the additional operating time period and/or values of the time period achievement rate each included in the generated analytical information regarding the operating time period, among the orders of the same production date;

the past-order identification part of the operation result evaluation device is operable to identify a past-order of a past production date having the same corrugated paperboard box specifications as those in the order information of the order selected by the first order selection part; and the past information acquisition part of the operation result evaluation device is operable to acquire a past additional operating time period and/or a past time period achievement rate in the past-order of the past production date identified by the past-order identification part, and acquire the past production date of the identified past-order, wherein the comparative information for each of the entirety or part of the given number of orders to be generated by the comparative information generation part of the operation result evaluation device is a combination of the comparative information for the order selected by the first selection part and the comparative information for the past-order identified by the past-order identification part, and wherein:

the comparative information generation part is operable to generate the comparative information by associating the additional operating time period and/or the time period achievement rate in the selected order; the production date of the selected order; the past additional operating time period and/or the past time period achievement rate in the identified past-order; the production date of the identified past-order; and the order information common in them, with each other; and the information transmission control part is operable to cause the generated comparative information to be transmitted to the user terminal.

3. The operation result evaluation system as recited in claim 1, wherein:

the analytical information generation part of the operation result evaluation device is operable to, with respect to each of the orders of the same production date, generate the analytical information regarding the operation time period;

the past-order identification part is operable to, with respect to each of the orders of the same production date, identify a past-order of a past production date having the same corrugated paperboard box specifications as those in the order information of any one of the orders of the same production date;

the past information acquisition part of the operation result evaluation device is operable to, with respect to the identified past-order of the past production date, acquire the analytical information regarding the past operating time period in the database stored in the storage device, and the production date in the operation result information associated with the analytical information; and the operation result evaluation device further comprises a second order selection part configured to compare each of the additional operating time period and/or the time period achievement rate included in the analytical information regarding the operating time period in each of the orders of the same production date generated by the analytical information generation part, with a corresponding one of the past additional operating time period and/or the past time period achievement rate included in the analytical information regarding the past operating time period in the past-order of the past production date acquired by the past information acquisition part configured to select an order having a largest difference in terms of the additional operating time period and/or the time period achievement rate, wherein the comparative information for the entirety or part of the given number of orders to be generated by the comparative information generation part of the operation result evaluation device is a combination of the comparative information for the order selected by the second selection part and the comparative information for the past-order having the same corrugated paperboard box specifications as those in the order information of the selected order, and wherein:

the comparative information generation part is operable to generate the comparative information by associating the additional operating time period and/or the time period achievement rate in the selected order; the production date of the selected order; the past additional operating time period and/or the past time period achievement rate in the past-order; the past production date of the past-order; and the order information common in them, with each other; and the information transmission control part is operable to cause the generated comparative information to be transmitted to the user terminal.

4. The operation result evaluation system as recited in claim 1, wherein:

the analytical information regarding the operating time period in each order, which is to be generated by the analytical information generation part, include the achieved production count in each order, calculated by the achieved production count calculation part; and the comparative information to be generated by the comparative information generation part includes the achieved production count in each order, included in the analytical information.

5. The operation result evaluation system as recited in claim 1, wherein the achieved operating time period calculation part of the production management device is operable to calculate, as the achieved operating time period, an operating time period during which an operation state is detected in which two or more corrugated paperboard boxes are produced per 5 seconds by the box making machine.

6. The operation result evaluation system as recited in claim 1, wherein the order information includes a sheet conveyance directional sheet length, and a binding number of box-structured corrugated paperboard sheets, each of which is to be set with respect to each order, and wherein the limited operating speed calculation part of the operation result evaluation device is operable to, with respect to each order, calculate the limited operating speed of the box making machine to be limited depending on each order, based on the sheet conveyance directional sheet length and the binding number, each included in the order information; and values of the limited operating speed of the box making machine each predetermined with respect to a respective one of various combinations of values of the sheet conveyance directional sheet length and values of the binding number.

7. The operation result evaluation system as recited in claim 1, wherein the given database stored in the storage device further comprises a database for storing the operation result information in each order generated by the operation result information generation part of the production management device, in association with the order information of the order, and wherein:

the achieved production count calculation part of the operation result evaluation device is operable to, with respect to each order, calculate, based on the operation result information stored in the database, the achieved production count which is a number of corrugated paperboard boxes produced by the box making machine during the achieved operating time period; and the limited operating speed calculation part of the operation result evaluation device is operable to, with respect to each order, calculate, based on the order information stored in the database, the limited operating speed of the box making machine to be limited depending on each order.

8. The operation result evaluation system as recited in claim 1, wherein the given database stored in the storage device further includes a database for storing the operation result information in each order generated by the operation result information generation part of the production management device, in association with the order information of the order, wherein the analytical information regarding the operating time period of the box making machine in each order generated by the analytical information generation part of the operation result evaluation device, and the comparative information generated by the comparative information generation part, are stored in the given database, in association with the order information and the operation result information each stored in the given database.

9. The operation result evaluation system as recited in claim 1, which further comprises a server device capable of transmitting and receiving information with respect to each of the production management device and the operation result evaluation device, and capable of transmitting information to the user terminal, wherein the information transmission control part of the operation result evaluation device is configured to cause the comparative information generated by the comparative information generation part configured to be transmitted to the user terminal via the server device.

10. The operation result evaluation system as recited in claim 1, wherein the production management device is provided on a side of a producer who produces corrugated paperboard boxes using the box making machine, and the operation result evaluation device is provided on a side of a manufacturer of the box making machine.

11. The operation result evaluation system as recited in claim 1, wherein the production management device is provided on a side of a producer who produces corrugated paperboard boxes using the box making machine, and the operation result evaluation device and the storage device are provided on a side of a manufacturer of the box making machine.

12. The operation result evaluation system as recited in claim 1, wherein the production management device and the operation result evaluation device are provided on a side of a producer who produces corrugated paperboard boxes using the box making machine.

13. The operation result evaluation system as recited in claim 1, wherein the production management device and the operation result evaluation device are provided on a side of a producer who produces corrugated paperboard boxes using the box making machine, and the storage device is provided on a side of a manufacturer of the box making machine.

14. The operation result evaluation system as recited in claim 1, wherein the production management device, the operation result evaluation device and the database are provided on a side of a producer who produces corrugated paperboard boxes using the box making machine.

15. The operation result evaluation system as recited in claim 1, wherein the box making machine comprises: a sheet feeder for feeding corrugated paperboard sheets one-by-one; a printer for subjecting the fed corrugated paperboard sheet to printing; a creaser-slotter for subjecting the resulting corrugated paperboard sheet to creasing, slotting and formation of joint flaps; a folder-gluer for applying glue onto the joint flaps and then folding the resulting corrugated paperboard sheet along each crease to bondingly form a box-structured corrugated paperboard sheet; and a counter-ejector for counting a number of the box-structured corrugated paperboard sheets to form a batch consisting of a binding number of the box-structured corrugated paperboard sheets, and ejecting the batch.

16. An operation result evaluation system for use in a corrugated paperboard box making machine to evaluate an operation result of the box making machine, based on order information which is information regarding an order for corrugated paperboard boxes, and operation result information which is information regarding the operation result of the box making machine, comprising:
a production management device for the box making machine, the production management device comprising
a production count counting part configured to count a production count which is a number of corrugated paperboard boxes produced for each order by the box making machine,
an achieved operating time period calculation part configured to calculate an achieved operating time period during which corrugated paperboard boxes have been produced for each order by the box making machine, and
an operation result information generation part configured to, with respect to each order, generate operation result information including production date of corrugated paperboard boxes, the production count and the achieved operating time period;
an operation result evaluation device configured to, after completion of production of corrugated paperboard boxes for a given order, evaluate the operation result of the box making machine, with regard to a given number of orders; and
a storage device for storing therein a given database,
wherein the operation result evaluation device comprises:
an achieved production count calculation part configured to, with respect to each order, calculate, based on the generated operation result information, an achieved production count which is a number of corrugated paperboard boxes produced by the box making machine during the achieved operating time period;
a limited operating speed calculation part configured to, with respect to each order, calculate, based on the order information, a limited operating speed of the box making machine to be limited depending on each order;
a target operating speed setting part configured to, with respect to each order, set the calculated limited operating speed of the box making machine, as a target operating speed;
an achieved operating speed calculation part configured to, with respect to each order, calculate an achieved operating speed of box making machine, based on the calculated achieved production count and the achieved operating time period;
a target and result comparison part configured to, with respect to each order, compare the set target operating speed with the calculated achieved operating speed to calculate an operating speed difference which is a difference between the target operating speed and the achieved operating speed, and/or a speed achievement rate which is a quotient obtained by dividing the achieved operating speed by the target operating speed; and
an analytical information generation part configured to generate analytical information regarding the operating speed in each order, based on the achieved operating speed, the calculated operating speed difference and/or the calculated speed achievement rate,
wherein the given database stored in the storage device includes the analytical information regarding the operating speed in each order, and the production date in the operation result information and the order information in each order associated with the analytical information regarding the operating speed,
and wherein the operation result evaluation device further comprises:
a past-order identification part configured to refer to order information of past production dates in the database stored in the storage device to, with respect to each of an entirety or part of the given number of orders, identify a past-order of a past production data having the same corrugated paperboard box specifications as those in the order information of any one of the entirety or part of the given number of orders;

a past information acquisition part configured to acquire analytical information regarding a past operating speed for the identified past-order, in the database stored in the storage device, and a production date in the operation result information associated with the acquired analytical information;

a comparative information generation part configured to, with respect to each of an entirety or part of the given number of orders, associate the generated analytical information regarding the operating speed and the production date thereof, the acquired analytical information regarding the past operating speed the past production date thereof, and the order information common in them, thereby generating comparative information; and an information transmission control part configured to cause the generated comparative information to be transmitted to a user terminal.

17. An operation result evaluation device for use in a corrugated paperboard box making machine to, after completion of production of corrugated paperboard boxes for a given order, evaluate an operation result of the box making machine, based on order information which is information regarding an order for corrugated paperboard boxes, and operation result information which is information regarding the operation result of the box making machine, comprising:

an achieved production count calculation part configured to, with respect to each order, calculate, based on information regarding an achieved operating time period and information regarding a number of produced corrugated paperboard boxes, each obtained from a production management device for the box making machine, an achieved production count which is a number of corrugated paperboard boxes produced by the box making machine during the achieved operating time period;

a limited operating speed calculation part configured to, with respect to each order, calculate, based on the order information, a limited operating speed of the box making machine to be limited depending on each order;

a target operating time period calculation part configured to, with respect to each order, calculate a target operating time period, based on the calculated achieved production count and the calculated limited operating speed;

a target and result comparison part configured to, with respect to each order, compare the calculated target operating time period with the achieved operating time period obtained from the production management device to calculate an additional operating time period which is a difference between the target operating time period and the achieved operating time period, and/or a time period achievement rate which is a quotient obtained by dividing the target operating time period by the achieved operating time period;

an analytical information generation part configured to generate analytical information regarding the operating time period in each order, based on the calculated additional operating time period and/or the calculated time period achievement rate;

a storage part configured to store a database regarding the generated analytical information regarding the operating time period for each order, and a production date included in the operation result information and the order information for each order, associated with the analytical information regarding the operating time period;

a past-order identification part configured to refer to order information of past production dates in the database stored in the storage device to, with respect to each order, identify a past-order of a past production date having the same corrugated paperboard box specifications as those in the order information of the order;

a past information acquisition part configured to acquire analytical information regarding a past operating time period for the identified past-order, in the database stored in the storage device, and a production date in the operation result information associated with the acquired analytical information;

a comparative information generation part configured to, with respect to each order, associate the generated analytical information regarding the operating time period and the production date thereof, the acquired analytical information regarding the past operating time period and the past production date thereof, and the order information common in them, thereby generating comparative information; and an information transmission control part configured to cause the generated comparative information to be transmitted to a user terminal.

* * * * *